United States Patent
Teng et al.

(10) Patent No.: US 12,495,388 B2
(45) Date of Patent: Dec. 9, 2025

(54) CALIBRATION OF INTERCONNECTED TRACKING DEVICES

(71) Applicant: QUALCOMM Incorporated, San Diego, CA (US)

(72) Inventors: Diyan Teng, Santa Clara, CA (US); Mahdi Shaghaghi, La Jolla, CA (US); Rashmi Kulkarni, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/821,428

(22) Filed: Aug. 22, 2022

(65) Prior Publication Data
US 2024/0064693 A1 Feb. 22, 2024

(51) Int. Cl.
*H04W 64/00* (2009.01)

(52) U.S. Cl.
CPC ....... *H04W 64/006* (2013.01); *H04W 64/003* (2013.01)

(58) Field of Classification Search
CPC ... H04W 4/023; H04W 4/026; H04W 64/003; H04W 64/006
See application file for complete search history.

(56) References Cited

U.S. PATENT DOCUMENTS

| | | | |
|---|---|---|---|
| 2013/0131981 A1* | 5/2013 | Hawkinson | G01C 25/005 382/218 |
| 2019/0254544 A1* | 8/2019 | Chayat | G01S 7/415 |
| 2019/0349716 A1 | 11/2019 | Liu et al. | |

FOREIGN PATENT DOCUMENTS

| | | | | |
|---|---|---|---|---|
| CN | 112035579 B | * | 2/2024 | G06F 16/22 |

OTHER PUBLICATIONS

International Search Report and Written Opinion—PCT/US2023/069099—ISA/EPO—Aug. 23, 2023.

* cited by examiner

*Primary Examiner* — Zhensheng Zhang
(74) *Attorney, Agent, or Firm* — QUALCOMM Incorporated

(57) ABSTRACT

Systems and techniques are provided for calibrating tracking devices. For example, a process can include generating, at a primary tracking device of a tracking device network, pose information of the primary tracking device; obtaining relative pose information of a secondary tracking device of the tracking device network, wherein the relative pose information of the secondary tracking device comprises a relative position and orientation between the primary tracking device and the secondary tracking device; obtaining absolute pose information of the secondary tracking device using the pose information of the primary tracking device and the relative pose information of the secondary tracking device; and transmitting, at the primary tracking device, the absolute pose information to the secondary tracking device for performing a calibration action.

23 Claims, 9 Drawing Sheets

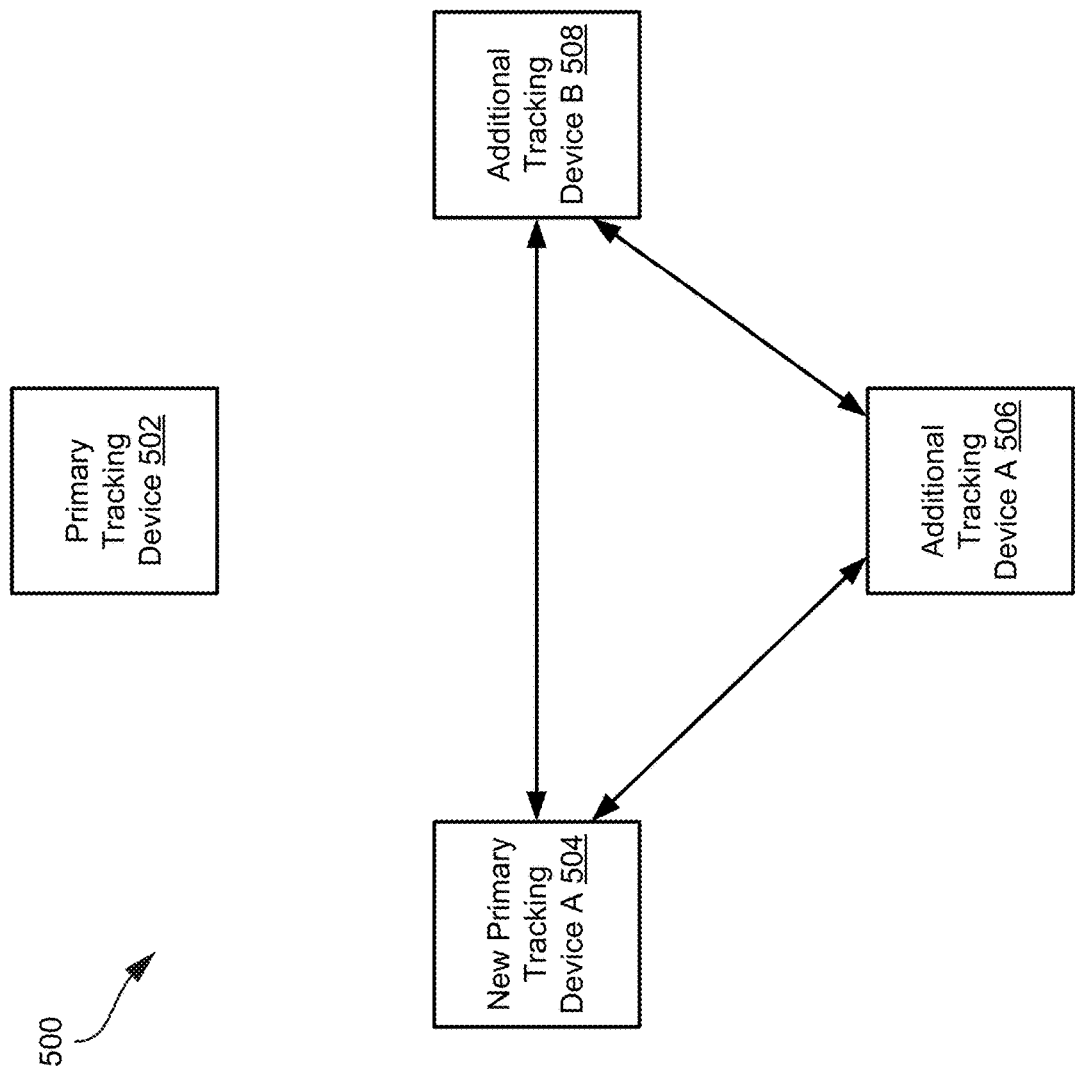

CALIBRATION OF INTERCONNECTED TRACKING DEVICES

FIELD

The present disclosure generally relates to calibration of tracking devices. In some examples, aspects of the present disclosure are related to systems and techniques for sharing pose information between higher accuracy tracking devices and lower accuracy tracking devices to allow for calibration of the lower accuracy tracking devices.

BACKGROUND

An increasing number of scenarios exist in which a user has a variety of devices, each of which is capable of tracking the location and/or movement of the user. Some of the devices may include certain components, sensors, features, etc. that allow the devices to perform the tracking with a relatively higher degree of accuracy than other of the devices. However, although such devices may be in the possession of a certain user, the devices may not communicate information related to each devices tracking of the user's movement or location.

SUMMARY

In some examples, systems and techniques are described for providing offloading services. According to at least one illustrative example, a method for tracking device calibration is provided. The method includes: generating, at a primary tracking device of a tracking device network, pose information of the primary tracking device; obtaining relative pose information of a secondary tracking device of the tracking device network, wherein the relative pose information of the secondary tracking device comprises a relative position and orientation between the primary tracking device and the secondary tracking device; obtaining absolute pose information of the secondary tracking device using the pose information of the primary tracking device and the relative pose information of the secondary tracking device; and transmitting, at the primary tracking device, the absolute pose information to the secondary tracking device for performing a calibration action.

In another illustrative example, a method for tracking device calibration is provided. The method includes: generating, at a secondary tracking device of a tracking device network, absolute pose information of the secondary tracking device using pose information of a primary tracking device and relative pose information between the secondary tracking device and the primary tracking device; performing a calibration action using the absolute pose information of the secondary tracking device, wherein, after performing the calibration action, the secondary tracking device becomes a new primary tracking device; generating, at the new primary tracking device, pose information of the new primary tracking device; generating, at the new primary tracking device, relative pose information of an additional tracking device in the tracking device network, wherein the relative pose information of the additional tracking device comprises a relative position and orientation between the new primary tracking device and the additional tracking device; obtaining absolute pose information of the additional tracking device using the pose information of the new primary tracking device and the relative pose information of the additional tracking device; and transmitting the absolute pose information to the additional tracking device for performing a second calibration action.

In another illustrative example, an apparatus for tracking device calibration is provided that includes a primary tracking device of a tracking device network. The primary tracking device comprises a memory device and a processor coupled to the memory device. The processor is configured to: generate, at the primary tracking device, pose information of the primary tracking device; obtain relative pose information of a secondary tracking device of the tracking device network, wherein the relative pose information of the secondary tracking device comprises a relative position and orientation between the primary tracking device and the secondary tracking device; obtain absolute pose information of the secondary tracking device using the pose information of the primary tracking device and the relative pose information of the secondary tracking device; and transmit, at the primary tracking device, the absolute pose information to the secondary tracking device for performing a calibration action.

In another illustrative example, an apparatus for tracking device calibration is provided that includes a secondary tracking device of a tracking device network. The secondary tracking device comprises a memory device and a processor coupled to the memory device. The processor is configured to: generate, at the secondary tracking device, absolute pose information of the secondary tracking device using pose information of a primary tracking device and relative pose information between the secondary tracking device and the primary tracking device; perform a calibration action using the absolute pose information of the secondary tracking device, wherein, after performing the calibration action, the secondary tracking device becomes a new primary tracking device; generate, at the new primary tracking device, pose information of the new primary tracking device; generate, at the new primary tracking device, relative pose information of an additional tracking device in the tracking device network, wherein the relative pose information of the additional tracking device comprises a relative position and orientation between the new primary tracking device and the additional tracking device; obtain absolute pose information of the additional tracking device using the pose information of the new primary tracking device and the relative pose information of the additional tracking device; and transmit the absolute pose information to the additional tracking device for performing a second calibration action.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), any combination thereof, and/or other type of device. In some aspects, the apparatus(es) include(s) a camera or multiple cameras for capturing one or more images. In some aspects, the apparatus(es) include(s) a display for displaying one or more images, notifications, and/or other displayable data. In some aspects, the apparatus (es) include(s) can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 5 is a block diagram illustrating a network of tracking devices from which a primary tracking device is removed, in accordance with some examples;

DETAILED DESCRIPTION

Figure 1:
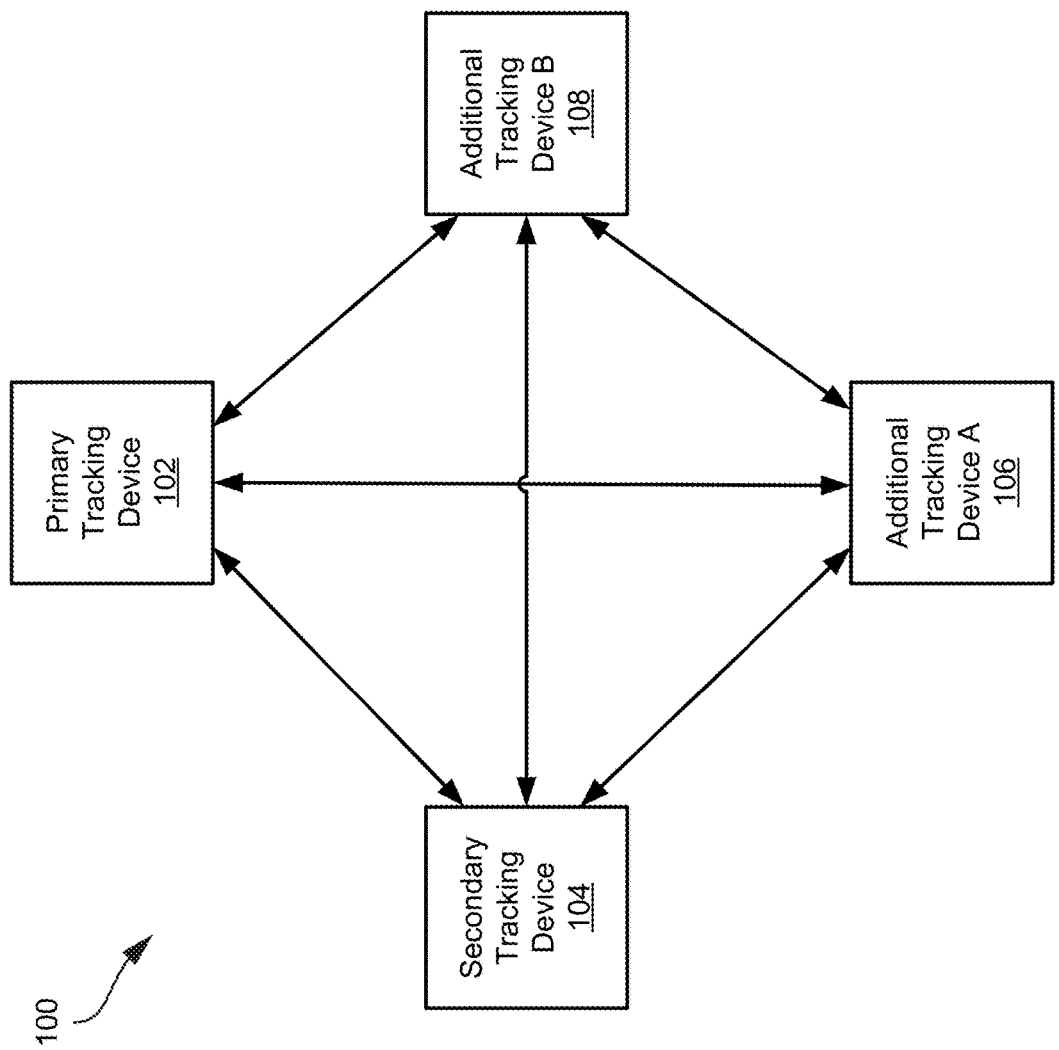
FIG. 1 is a block diagram illustrating a network of tracking devices, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive. Additionally, certain details known to those of ordinary skill in the art may be omitted to avoid obscuring the description.

In the below description of the figures, any component described with regard to a figure, in various examples described herein, may be equivalent to one or more like-named components described with regard to any other figure. For brevity, descriptions of these components may not be wholly repeated with regard to each figure. Thus, each and every example of the components of each figure is incorporated by reference and assumed to be optionally present within every other figure having one or more like-named components. Additionally, in accordance with various examples described herein, any description of the components of a figure is to be interpreted as an optional example, which may be implemented in addition to, in conjunction with, or in place of the examples described with regard to a corresponding like-named component in any other figure.

The ensuing description provides illustrative examples only, and is not intended to limit the scope, applicability, or configuration of the disclosure. Rather, the ensuing description of the illustrative examples will provide those skilled in the art with an enabling description for implementing an exemplary example. It should be understood that various changes may be made in the function and arrangement of elements without departing from the spirit and scope of the application as set forth in the appended claims.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. Additionally, operatively connected devices and/or components may exchange things other than information, such as, for example, electrical current, radio frequency signals, etc.

Devices that may be in the possession of a user are often configured to perform tracking of the location and/or movement of the user. Examples of such devices include, but are not limited to, wearable devices (e.g., extended reality (XR) devices such as augmented reality (AR) devices, virtual reality (VR) devices or mixed reality (MR) devices, smartphones, network-connected watches, activity trackers, earbuds, headphones, smart rings, smart shoes, etc.), vehicle computing systems, and/or mobile computing devices (e.g., tablet computers, laptop computers, navigation devices, vehicle computing devices, etc.). While such devices may each be capable of tracking the location and/or movement of a user, the devices may employ different technologies to perform the tracking. As such, the devices may provide relatively higher or lower tracking accuracy.

As an example, an XR headset may include components such as one or more global navigation satellite system (GNSS) receivers (e.g., global positioning system (GPS) receivers), one or more cameras, one or more wireless network components (e.g., Wi-Fi components), one or more cellular network components, one or more inertial measurement units (IMUs), one or more Bluetooth components, and/or a variety of other sensors. All or any portion of such components may be used to provide high accuracy tracking of the location and/or movement of a user wearing the XR headset. The same user may also be wearing a smartwatch, earbuds, etc., which may, for example, include only an IMU to perform tracking of the user's location and/or movement, with such tracking being relatively less accurate than the XR headset. The accuracy of the tracking performed by the smartwatch may be less accurate, for example, due to sensor bias and drift of the accelerometer and gyroscope of the IMU, such that the accuracy of the tracking degrades over time. Therefore, in the event that the user removes or turns off the XR headset, the tracking of the location and/or movement of the user by the lower accuracy tracking device alone will be less accurate, and become more so over time. Accordingly, in order to address the increasing accuracy of lower accuracy tracking devices, such components of devices should be calibrated. Therefore, systems and techniques are needed for determining the location and pose (e.g., position and orientation) of the lower accuracy tracking devices, which allows the devices to perform calibration actions from time to time in order to provide more accurate tracking of location and/or movement.

Systems, apparatuses, processes (also referred to as methods), and computer-readable media (collectively referred to as "systems and techniques") are described herein for determining the position and orientation of lower accuracy tracking devices, thereby allowing the devices to perform calibration actions to improve tracking accuracy. In some examples, a network is established that includes one or more lower accuracy tracking devices and at least one higher accuracy tracking device. In some examples, a higher accuracy tracking device may be referred to as a primary tracking device, and a lower accuracy tracking device may be referred to as a secondary tracking device or an additional tracking device. As an example, a given user may have an XR headset as a higher accuracy tracking device, and a smartwatch and a smartphone as lower accuracy tracking devices.

In some examples, the primary tracking device includes components (e.g., sensors, cameras, GPS receivers, etc.) that allow the primary tracking device to perform high accuracy tracking of location and/or movement by determining the pose (position and orientation) of the primary tracking device in an environment. As an example, a primary tracking device may use image data from one or more cameras, GPS data, and IMU data to determine the pose of the primary tracking device. In some examples, the pose of the primary tracking device may be determined for 6-Degrees of Freedom (6DoF), which may refer to three translational components (e.g., which can be given by X (horizontal), Y (vertical), and Z (depth) coordinates relative to a frame of reference, such as, for example, an image plane) and three angular components (e.g. roll, pitch, and yaw relative to the same frame of reference).

In some examples, the secondary or additional tracking devices may include less components and/or components that experience sensor bias and drift, such as, for example, an IMU that includes an accelerometer and a gyroscope. In some examples, sensor bias refers to an offset in an output signal from a sensor relative to what the true output should be, and sensor drift refers to an increase in such an offset over time (e.g., due to environmental conditions experienced by the sensor, wear on the sensor, etc.).

In some examples, a tracking device network may be established among the primary tracking device and the one or more secondary or additional tracking devices. As used herein, a network of devices may mean that the devices are capable of communicating with one another and/or determining information about one another using any one or more suitable techniques. In some examples, in order to improve the ability of the secondary or additional tracking devices in the network to determine their pose in an environment, systems and techniques are provided to allow for the calibration of one or more sensors of the secondary or additional devices. In some examples, sensor calibration refers to any process or technique for adjusting a sensor such that the output of the sensor more accurately reflects the true value of whatever the sensor is designed to measure (e.g., acceleration for an accelerometer, angular velocity for a gyroscope, etc.)

In some examples, a secondary tracking device performs a calibration action on one or more sensors based at least in part on obtaining accurate pose information for the secondary or additional tracking device. In some examples, accurate pose information for the secondary or additional tracking device (which may be referred to as absolute pose information of the secondary or additional tracking device) is obtained based on pose information of the primary tracking device, and relative pose information between the primary tracking device and the secondary or additional tracking device.

As discussed above, the primary tracking device may use any combination of components to determine accurate pose information for the primary tracking device (e.g., GPS information combined with IMU information and image data). In some examples, relative pose information between the primary tracking device and the secondary or additional tracking device is generated using multiple-input multiple-output (MIMO) transceivers. In some examples, primary tracking device and the secondary or additional tracking devices may each have any number of MIMO transceivers. As used herein, a transceiver may be a component configured to transmit, receive, or both transmit and receive signals. In some examples, the MIMO transceivers are located at any number of locations on each of the tracking devices. For example, a smartphone may have a MIMO transceiver at the top of the device, and on both sides of the device. In some examples, the MIMO transceivers are used to transmit or receive signals of any type that allow for a relative position and orientation between two transceivers to be ascertained. Examples of techniques using various suitable signal types include, but are not limited to, millimeter wave (mmWave) techniques, ultra-wideband (UWB) techniques, and/or ultrasound techniques.

In some examples, such techniques operate by transmitting a signal of an appropriate frequency and/or wavelength from a MIMO transceiver on one tracking device to a MIMO transceiver on another tracking device to measure a relative position and orientation (e.g., a relative pose) between the two MIMO transceivers. In some examples, several measurements from MIMO transceivers are combined to determine a relative pose between the two devices. In some examples, the relative pose information is combined with the pose information of the primary tracking device to determine the absolute pose information of the secondary or additional tracking device. In some examples, the primary tracking device MIMO transceivers are receivers, and the primary tracking device generates the relative pose information, combines the relative pose information with its pose information to generate the absolute pose information of the secondary or additional tracking device, and transmits the absolute pose information of the secondary or additional tracking device to the secondary or additional tracking device. Additionally or alternatively, in some examples, the secondary or additional tracking device MIMO transceivers are receivers, and the secondary or additional tracking device generates the relative pose information and combines it with pose information of and received from the primary tracking device to generate the absolute pose information of the secondary or additional tracking device.

In some examples, once the secondary or additional tracking device has the absolute pose information of the secondary or additional tracking device, the secondary or additional tracking device uses the absolute pose information to calibrate one or more sensors. As an example, the secondary or additional tracking device may use the absolute pose information to calibrate a gyroscope and an accelerometer of an IMU of the secondary or additional tracking device.

In some examples, once the secondary or additional tracking device has performed a calibration action based on the absolute pose information, the secondary or additional tracking device may be considered a high accuracy tracking device. In some examples, the amount of time that the secondary or additional tracking device may be considered a high accuracy tracking device depends on characteristics of the secondary or additional tracking device, such as the amount of time the accuracy of the calibrated sensor is expected to remain accurate within a certain level of confidence (e.g., before sensor drift renders the secondary or additional tracking device sensor below an acceptable level of accuracy). For example, a particular calibrated IMU may be expected to remain accurate within an acceptable level of confidence for ten minutes. In some examples, the above-described process of using absolute pose information of a secondary or additional tracking device to calibrate one or more sensors of the secondary or additional tracking device is repeated at any interval, for as long as the primary tracking device remains in the tracking device network.

A particular tracking device network may have any number of primary tracking devices and/or secondary or additional tracking devices at a given time. In some examples, the tracking devices in a tracking device network may change over time (e.g., devices may be added, devices may be removed). In some examples, if a tracking device network has no primary (e.g., high accuracy) tracking device, then the calibration process may cease until a primary tracking device is re-added to the tracking device network. As an example, if an XR headset is the primary tracking device, and the user turns the XR headset off, and no secondary or additional tracking device is currently calibrated to be accurate within a desired level of confidence, then the tracking device network does not include a primary tracking device. In some examples, if a primary tracking device is removed from a tracking device network, but a secondary or additional tracking device has recently been calibrated, the calibrated secondary or additional tracking device may become a new primary tracking device for as long as the secondary or additional tracking device is expected to remain accurate within a certain level of confidence. As such, in some examples, the new primary tracking device may perform the functions of a primary tracking device for other tracking devices in the tracking device network within that time period.

In some examples, the type of tracking device that a particular tracking device is within a tracking device network may change. In some examples, the change occurs due to a change in the situation of the particular tracking device. As an example, a smartphone may be capable of being a high accuracy tracking device only when a camera of the smartphone can obtain image data of the environment in which the smartphone exists. In such a scenario, the smartphone may be a secondary or additional tracking device when it is in the pocket of a user, but may transition to a primary (e.g., high accuracy) tracking device once the smartphone is removed from the pocket of the user and the camera is activated. As another example, to be a primary tracking device in a tracking device network, a tracking device may be required to be capable of generating 6DoF pose information. In such a scenario, if a user disables one or more components of a primary tracking device (e.g., turns off the camera and disables the GPS receiver), then the tracking device may become a secondary or additional tracking device instead of a primary tracking device within the tracking device network.

In some examples, having tracking devices within a tracking device network operate to allow the devices to each have accurate pose information may be useful in a variety of scenarios. As an example, a user may have an improved experience in a VR, XR, and/or AR environment (e.g., a 'metaverse') if the user has several tracking devices at different locations on the body of the user with accurate pose information. As another example, a user with tracking devices in a tracking device network may enter an environment (e.g., an indoor shopping area) in which certain components of the primary tracking device do not function well enough for the primary tracking device to remain a high accuracy tracking device, or the user may remove the primary tracking device from the tracking device upon entering such a location (e.g., the user removes the user's smart glasses after going indoors). In such a scenario, because the user has one or more secondary or additional tracking devices that have been properly calibrated to have accurate pose information, the location and/or movement of the user within the indoor environment may be accurately tracked, allowing for the user to experience, for example, improved targeted advertising via geofences upon reaching certain locations in the environment, improved navigation capabilities while in the environment, etc.

Examples described herein address the need to calibrate one or more sensors (e.g., an IMU) of secondary or additional tracking devices by using pose information of a primary tracking device and relative pose information between the primary tracking device and the secondary or additional tracking device to improve the accuracy of tracking the location and/or movement of the secondary or additional tracking device.

Various aspects of the techniques described herein will be discussed below with respect to the figures. FIG. 1 is a block diagram illustrating an example of a tracking device network 100 that includes a primary tracking device 102, a secondary tracking device 104, an additional tracking device A 106, and an additional tracking device B 108. Each of these components is described below.

In some examples, the tracking device network 100 is a set any of tracking devices configured with the capability to communicate with one another and/or to generate or obtain information (e.g., pose information) of other devices in the tracking device network 100. In some examples, each tracking device in the tracking device network is so configured for at least some of the time that the tracking device network 100 exists. In some examples, a tracking device is any device capable of tracking the location and/or movement of the device, at least in part, using pose information. In some examples, pose information is the position and orientation of a tracking device, and/or relative position and orientation between two tracking devices.

Tracking devices in the tracking device network may be configured to communicate using any suitable communication technology. Examples of such technologies include, but are not limited to, wireless network communication technologies (e.g., Wi-Fi), cellular communication technologies, Bluetooth communication technologies, near-field communication (NFS) technologies, radio frequency technologies, etc.

Information about other tracking devices in the tracking device network 100 may be obtained by a particular tracking device in the network by receiving the information using one or more such communication technologies, or by interactions between other components of the tracking devices. As an example, the tracking devices may include MIMO transceivers that transmit and/or receive signals that allow the devices to determine relative pose information between the devices.

Examples of tracking devices include, but are not limited to, wearable devices (e.g., extended reality (XR) devices, augmented reality (AR) devices, virtual reality (VR) devices, smartphones, smartwatches, activity trackers, earbuds, headphones, smart rings, smart shoes, etc.), vehicle computing systems, vehicle mount inertial tracking systems, tablet computers, mobile computing devices, navigation devices, etc.

Although FIG. 1 shows a tracking device network 100 with four tracking devices, the tracking device network may have any number of two or more tracking devices without departing from the scope of examples described herein. In some examples, at minimum, the tracking device network 100 has at least two tracking devices operatively connected to exchange information and/or determine or obtain information about one another. In some examples, the tracking device network 100 includes at least one primary tracking device (e.g., the primary tracking device 102) at least some of the time, and one or more secondary tracking devices (e.g., the secondary tracking device 104) and/or one or more additional tracking devices (e.g., the additional tracking device A 106 and the additional tracking device B 108). In some examples, the number of tracking devices in the tracking device network 100 changes over time, for example, as tracking devices are added to the network and/or removed from the network.

In some examples, the primary tracking device 102 is any tracking device capable of generating pose information for itself that is at or above a desired level of accuracy and, as such, may be considered a high accuracy tracking device. In some examples, the primary tracking device 102 is considered a high accuracy tracking device relative to secondary tracing devices (e.g., the secondary tracking device 104) and/or additional tracking devices (e.g., the additional tracking device A 106 and the additional tracking device B 108), which are capable of generating relatively less accurate pose information. In some examples, the primary tracking device 102 is configured to track pose information over time, thereby allowing the location and/or movement of the device to be tracked. In some examples, the primary tracking device 102 is a device capable of generating pose information for 6-Degrees of Freedom (6DoF), which may refer to three translational components (e.g., which can be given by X (horizontal), Y (vertical), and Z (depth) coordinates relative to a frame of reference, such as, for example, an image plane) and three angular components (e.g. roll, pitch, and yaw relative to the same frame of reference).

Although FIG. 1 shows the tracking device network 100 as having a single primary tracking device 102, the tracking device network 100 may include any number of primary tracking devices without departing from the scope of examples described herein. The number of primary tracking devices in the tracking device network 100 may change over time. As an example, primary tracking devices may be added to or removed from the tracking device network 100. As another example, a secondary or additional tracking device in the tracking device network may gain capabilities (e.g., be removed from a pocket, allowing the camera to obtain image data; features may be activated, etc.) that allow the device to become a primary tracking device. As another example, a primary tracking device (e.g., the primary tracking device 102) in the tracking device network 100 may lose capabilities (e.g., certain sensors are disactivated, the device is powered off, etc.), thereby lowering the accuracy of the pose information the primary tracking device 102 is capable of generating. In such a scenario, the primary tracking device 102 may or may or may not remain in the tracking device network 100. In some examples, if such a primary tracking device remains in the tracking device network 100, it may transition to become a secondary or additional tracking device in the tracking device network 100.

In some examples, the primary tracking device 102 is configured to generate high accuracy pose information of the primary tracking device 102 using any number of sensors, components, etc. of the primary tracking device. In some examples, the primary tracking device is configured to generate MIMO measurement information, and use the information to generate relative pose information between the primary tracking device 102 and one or more secondary tracking devices (e.g., the secondary tracking device 104) and/or additional tracking devices (e.g., the additional tracking device A 106 and the additional tracking device B 108). Additionally or alternatively, the primary tracking device may be configured to transmit signals (e.g., mmWave signals, UWB signals, ultrasound signals, etc.) to one or more secondary tracking devices (e.g., the secondary tracking device 104) and/or additional tracking devices (e.g., the additional tracking device A 106 and the additional tracking device B 108) so that the other one or more tracking devices may generate the relative pose information. In some examples, pose information of the primary tracking device 102 and relative pose information between the primary tracking device 102 and one of the other tracking devices may be used to calibrate one or more sensors of the other tracking device, thereby improving the accuracy of the one or more sensors. Information from one or more sensors or components of the primary tracking device 102 may also be used to calibrate other sensors or components of the primary tracking device 102. Primary tracking devices are discussed further in the description of FIG. 2, below.

In some examples, the secondary tracking device 104 is any device having one or more sensors of any type for tracking the location and/or position of the device, and that require calibration from time to time to remain accurate (e.g., an IMU). In some examples, the secondary tracking device 104 is a lower accuracy tracking device relative to the primary tracking device 102. The secondary tracking device 104 may be any of the example tracking devices discussed above. The secondary tracking device 104 may be operatively connected to the primary tracking device 102 and/or to any other devices in the tracking device network 100 (e.g., the additional tracking device A 106 and the additional tracking device B 108). Although FIG. 1 shows the tracking device network 100 as having a single secondary tracking device 104, the tracking device network 100 may have any number of secondary tracking devices without departing from the scope of examples described herein. The secondary tracking device 104 may be a different device type than the primary tracking device 102, or may be the same type of device.

In some examples, the additional tracking devices (e.g., the additional tracking device A 106 and the additional tracking device B 108) are shown in FIG. 1 to illustrate that the tracking device network 100 may include any number of tracking devices. In some examples, the additional tracking devices are, like the secondary tracking device 104, any device having one or more sensors of any type for tracking the location and/or position of the device, and that require calibration from time to time to remain accurate (e.g., an IMU). Each additional tracking device (e.g., the additional tracking device A 106 and the additional tracking device B 108) may be operatively connected to the primary tracking device 102. Each additional tracking device may also be operatively connected to the secondary tracking device 104 and/or any other additional tracking devices in the tracking device network. The additional tracking devices (e.g., the additional tracking device A 106 and the additional tracking device B 108) may be a different type of tracking device than the other tracking devices in the tracking device network, or all or any portion of the tracking devices may be the same type of device. For example, the primary tracking device may be smart glasses, the secondary tracking device a pair of ear buds, and the two additional tracking devices are both smartphones. Any combination of devices types may be in the tracking device network 100 without departing from the examples described herein.

In some examples, the secondary tracking device 104 and/or any additional tracking devices (e.g., the additional tracking device A 106 and the additional tracking device B 108) may become primary tracking devices. As an example, a secondary tracking device may have additional sensors (e.g., a camera) and/or features (e.g., GPS location tracking) activated that allow the secondary tracking device to perform more accurate tracking of location, position, and/or orientation (e.g., pose). As an example, they may be considered primary tracking devices after performing a calibration action such that a sensor (e.g., an IMU) is above a confidence level threshold for accuracy of tracking. In such a scenario, the secondary tracking device 104 and/or any additional tracking devices (e.g., the additional tracking device A 106 and the additional tracking device B 108) may remain primary tracking devices within the tracking device network 100 for a period of time based on the rate of sensor drift, and cease being primary tracking devices when the confidence level of the sensor output falls below a threshold. In some examples, a secondary tracking device 104 and/or any additional tracking devices (e.g., the additional tracking device A 106 and the additional tracking device B 108) that become a primary tracking device may be referred to as a new primary tracking device. In some examples, the secondary tracking device 104 and/or any additional tracking devices (e.g., the additional tracking device A 106 and the additional tracking device B 108) are each operatively connected to at least one primary tracking device (e.g., the primary tracking device 102), and are configured to generate or receive relative pose information, as well as receive pose information for a primary tracking device. Additionally or alternatively, the secondary tracking device 104 and/or any additional tracking devices (e.g., the additional tracking device A 106 and the additional tracking device B 108) may also be operatively connected to all or any portion of the other tracking devices in the tracking device network 100, and configured to share pose information. Secondary tracking devices and additional tracking devices are discussed further in the description of FIG. 3, below.

While FIG. 1 shows a certain number of components in a particular configuration, one of ordinary skill in the art will appreciate that the tracking device network 100 may include more components or fewer components, and/or components arranged in any number of alternate configurations without departing from the scope of examples described herein. Accordingly, examples disclosed herein should not be limited to the configuration of components shown in FIG. 1.

Figure 2:
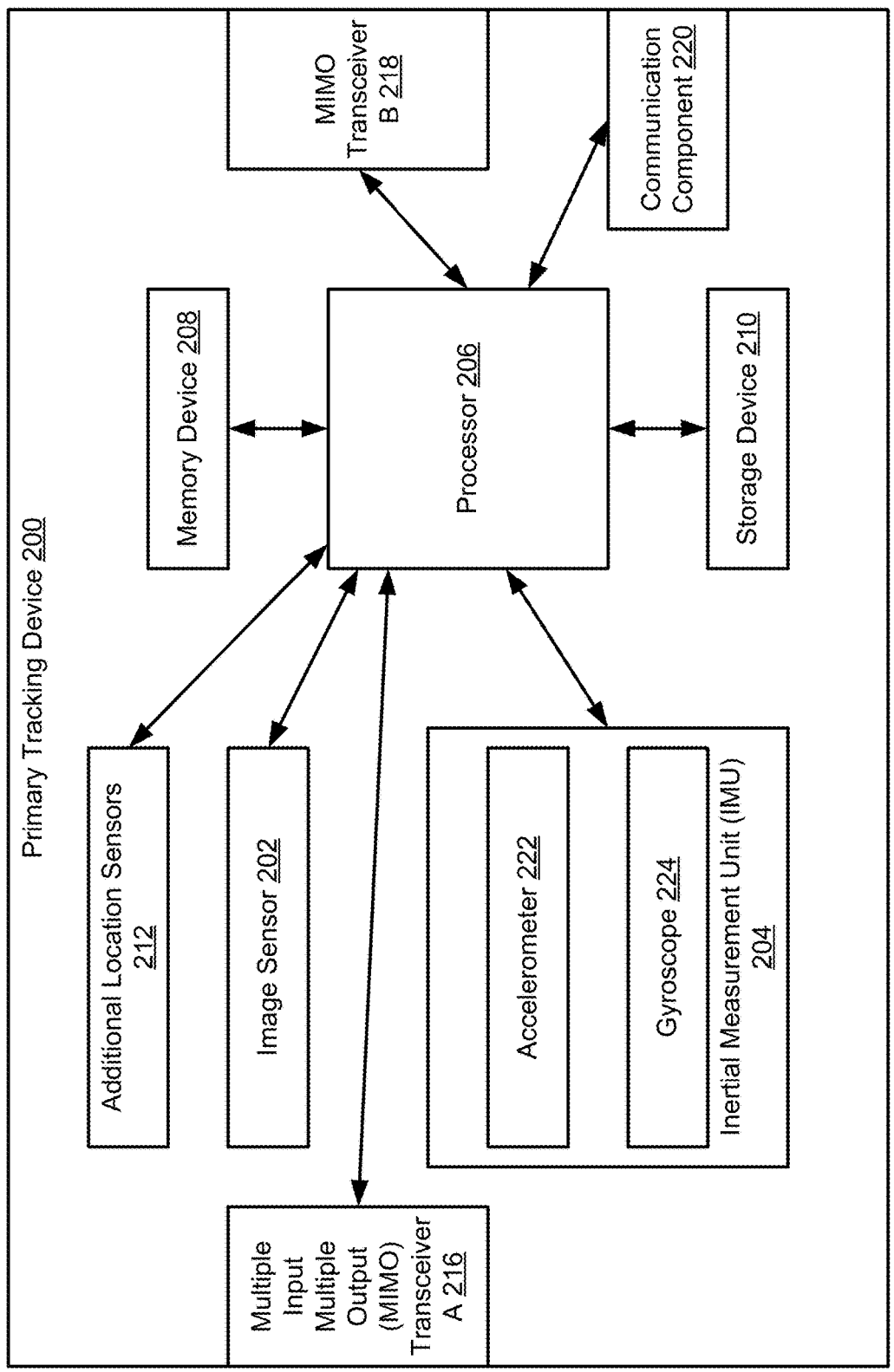
FIG. 2 is a block diagram illustrating a primary tracking device, in accordance with some examples.

FIG. 2 is a block diagram of an example primary tracking device 200 in accordance with one or more examples described herein. In some examples, the primary tracking device 200 is the same as the primary tracking device 102 shown in FIG. 1 and described above. As shown in FIG. 2, the primary tracking device 200 includes an image sensor 202, an IMU 204, a processor 206, a memory device 208, a storage device 210, additional location sensors 212, a MIMO transceiver A 216, a MIMO transceiver B 218, and a communication component 220. The IMU 204 includes an accelerometer 222 and a gyroscope 224. Each of these component is described below.

In some examples, as discussed above in the description of FIG. 1, the primary tracking device 200 is any tracking device capable of generating pose information for itself that is at or above a desired level of accuracy and, as such, may be considered a high accuracy tracking device. Examples of tracking devices include, but are not limited to, wearable devices (e.g., extended reality (XR) devices, augmented reality (AR) devices, virtual reality (VR) devices, smartphones, smartwatches, activity trackers, earbuds, headphones, smart rings, smart shoes, etc.), vehicle computing systems (e.g., vehicle navigation systems), tablet computers, mobile computing devices, navigation devices, etc. The primary tracking device 200 may be any such device. In some examples, the primary tracking device 102 is a device capable of generating pose information for 6-Degrees of Freedom (6DoF), which may refer to three translational components (e.g., which can be given by X (horizontal), Y (vertical), and Z (depth) coordinates relative to a frame of reference, such as, for example, an image plane) and three angular components (e.g. roll, pitch, and yaw relative to the same frame of reference). In some examples, the primary tracking device 200 is configured to use one or more components (discussed below) to determine pose information of the primary tracking device 200. As an example, the primary tracking device 200 may use the processor 206, the memory device 208, and the storage device 210 to process information from the IMU 204, the image sensor 202, and one or more of the additional location sensors 212 to generate pose information of the primary tracking device 200.

In some examples, the processor 206 is any component that includes circuitry for executing instructions (e.g., of a computer program). As an example, such circuitry may be integrated circuitry implemented, at least in part, using transistors implementing such components as arithmetic logic units, control units, logic gates, registers, etc. In some examples, the processor may include additional components, such as, for example, cache memory. In some examples, a processor retrieves and decodes instructions, which are then executed. Execution of instructions may include operating on data, which may include reading and/or writing data. In some examples, the instructions and data used by a processor are stored in the memory (e.g., memory device 208) of the primary tracking device 200. A processor may perform various operations for executing software, such as operating systems, applications, etc. The processor 206 may cause data to be written from memory to storage of the primary tracking device 200 and/or cause data to be read from storage via the memory. Examples of processors include, but are not limited to, central processing units (CPUs), graphics processing units (GPUs), neural processing units, tensor processing units, data processing units (DPUs), digital signal processors (DSPs), etc. The processor 206 may be operatively connected to the memory device 208, and any storage (e.g., the storage device 210) of the primary tracking device 200. Although FIG. 2 shows the primary tracking device 200 having one processor 206, the primary tracking device 200 may have any number of processors without departing from the scope of examples described herein.

In some examples, the primary tracking device 200 includes a storage device 210. In some examples, the storage device 210 is a non-volatile data storage device. The storage device 210 may, for example, be a persistent memory device. In some examples, the storage device 210 may be computer storage of any type. Examples of type of computer storage include, but are not limited to, hard disk drives, solid state drives, flash storage, tape drives, removable disk drives, Universal Serial Bus (USB) storage devices, secure digital (SD) cards, optical storage devices, read-only memory devices, etc. Although FIG. 1 shows the storage device 210 as part of the primary tracking device 200, the storage device 210 may be separate from and operatively connected to the primary tracking device 200 (e.g., an external drive array, cloud storage, etc.). In some examples, the storage device 210 is operatively connected to the processor 206. Although FIG. 2 shows the primary tracking device 200 having a single storage device 210, the primary tracking device 200 may have any number of storage devices without departing from the scope of examples described herein.

In some examples, the primary tracking device 200 includes a memory device 208. The memory device 208 may be any type of computer memory. In some examples, the memory device 208 is a volatile storage device. As an example, the memory device 208 may be random access memory (RAM). In one or more examples, data stored in the memory device 208 is located at memory addresses, and is thus accessible to the processor 206 using the memory addresses. Similarly, the processor 206 may write data to the memory device 208 using the memory addresses. The memory device 208 may be used to store any type of data, such as, for example, computer programs, the results of computations, sensor data, etc. In some examples, the memory device 208 is operatively connected to the processor 206. Although FIG. 2 shows the primary tracking device 200 having a single memory device 208, the primary tracking device 200 may have any number of memory devices without departing from the scope of examples described herein.

In some examples, the primary tracking device device 200 includes one or more additional location sensors 212. The primary tracking device 200 may include any number of additional location sensors 212 without departing from the scope of examples described herein. A sensor may be any device capable of obtaining data of any type about an environment or anything in the environment. Examples of additional location sensors include, but are not limited to, sound sensors, pressure sensors, image capture devices, temperature sensors, radio detection and ranging (RADAR) devices, light detection and ranging (LIDAR) devices, motion sensors, location tracking devices (e.g., GPS receivers), collision detection devices, proximity sensors, accelerometers, gyroscopes, magnetometers, infrared sensors, ultrasonic sensors, smoke detectors, gas detectors, touch sensors, color sensors, humidity sensors, precipitation sensors, fluid flow sensors, magnetic sensors, tilt sensors, strain and weight sensors, etc. The primary tracking device 200 may have any number of sensors of a single type, or any combination of types. In some examples, the additional location sensors 212 are operatively connected to the processor 206 and/or to the storage device 210. In some examples, data from one or more additional location sensors 212 is stored in the storage device 210. In some examples, data from one or more additional location sensors 212 are processed by the processor 206, possibly with data from other sources (e.g., the IMU 204, the image sensor 202, etc.) to obtain a result, which may include the pose of the primary tracking device 200. The additional location sensors 212 may be used to obtain data at scheduled times, upon request, in response to events occurring (e.g., event driven sensing), and/or any combination thereof.

In some examples, the primary tracking device 200 includes the communication component 220. The communication component 220 may be any component capable of transmitting and/or receiving data (e.g., pose information) wirelessly. Examples of communication components include, but are not limited to, wireless transceivers, modems, and/or other components implementing any type of wireless communication technology. Such types of wireless communication technology include, but are not limited to, radio frequency communication, cellular network communication, Bluetooth communication, infrared communication, satellite communication, microwave communication, visible light communication (e.g., Li-Fi), wireless network communication (e.g., Wi-Fi), ultrasonic communication, etc. Although FIG. 2 shows the primary tracking device 200 having a single communication component 220, the primary tracking device 200 may have any number of communication components without departing from the scope of examples therein, and such communication components may use a single wireless communication technology or a mix of any number of different wireless communication technologies. In some examples, the communication component 220 is operatively connected to the processor 206 and/or to the additional location sensors 212. In some examples, the communication component 220 is configured to transmit data (e.g., sensor data, results of operations, processed data, etc.) to and/or receive data from one or more secondary and/or additional tracking devices in a tracking device network (e.g., the tracking device network 100 of FIG. 1).

In some examples, the primary tracking device includes the image sensor 202. In some examples, the image sensor 202 is any device capable of optically perceiving and capturing an image (e.g., a two-dimensional representation) of at least a portion of an environment in which the primary tracking device 200 exists. As an example, the image sensor 202 may be a camera. A camera may obtain an image via light in the visible spectrum, or any other portion of the electromagnetic spectrum. The camera may be any type of camera without departing from the scope of examples described herein. Examples of types of cameras include, but are not limited to, video cameras, digital cameras, plate cameras, single lens reflex cameras, mobile device cameras, security cameras, etc. In some examples, the image sensor 202 is operatively connected to the processor 206. In some examples, the image sensor 202 is configured to capture images of at least a portion of an environment, and to provide or make available data representing the image (e.g., image data) to the processor 206 and/or the storage device 210. In some examples, the image sensor 202 may be capable of being repositioned to capture different portions of the environment via panning, tilting, tracking, etc. In some examples, the image sensor 202 is configured with a zoom capability. Although FIG. 1 shows the primary tracking device 200 as having a single image sensor 202, the primary tracking device 200 may have any number of image sensors without departing from the scope of examples described herein.

In some examples, the primary tracking device 200 includes the IMU 204. In some examples, the IMU 204 is an electronic component that measures and provides as output various characteristics from sensors (e.g., the accelerometer 222 and the gyroscope 224) related to the location and/or position of the primary tracking device 200, such as, for example, specific force, angular rate, orientation, etc. In some examples, the IMU 204 includes the accelerometer 222. In some examples, the accelerometer 222 is a component that measures and provides as output the acceleration of a body in its instantaneous rest frame (e.g., specific force). In some examples, the IMU 204 also includes the gyroscope 224. In some examples, the gyroscope 224 is a component that measures and provides as output information angular velocity. The output from the accelerometer 222 may be combined with the output from the gyroscope 224 to provide tracking of the location, position, and/or orientation of the primary tracking device 200. The output of the IMU 204 may be combined with the output of other components of the primary tracking device 200 (e.g., the image sensor 202, one or more of the additional location sensors 212, etc.) to generate pose information of the primary tracking device 200. Although not shown in FIG. 2, the IMU 204 may be part of a component, such as, for example, an inertial navigation system (INS). The IMU 204 may include any number of additional components (e.g., magnetometers, accelerometers, gyroscopes, etc.) without departing from the scope of examples described herein. The IMU 204 may be operatively connected to any other component of the primary tracking device, such as, for example, the processor 206. Although FIG. 2 shows the primary tracking device 200 as having a single IMU 204, the primary tracking device 200 may include any number of IMUs without departing from the scope of examples described herein.

In some examples, the primary tracking device 200 includes any number of MIMO transceivers. In the example shown in FIG. 2, the primary tracking device includes two MIMO transceivers, the MIMO transceiver A 216 and the MIMO transceiver B 218. In some examples, a MIMO transceiver is any component capable of transmitting and/or receiving signals of any frequency or wavelength. In some examples, the MIMO transceivers are located at any number of locations on the primary tracking device 200. In the example shown in FIG. 2, the MIMO transceiver A 216 is positioned on one side of the primary tracking device 200, and the MIMO transceiver B 218 is positioned on the opposite side. In some examples, a MIMO transceiver of the primary tracking device may be configured to receive signals (e.g., mmWave signals, UWB signals, ultrasonic signals, etc.) from MIMO transceivers on other tacking devices (e.g., secondary and/or additional tracking devices). In such examples, the primary tracking device may be configured to use the received signals to determine the relative position and/or orientation of the transmitting and receiving MIMO transceivers. In some examples, each MIMO transceiver on the primary tracking device may receive signals from any number of MIMO transceivers on secondary or additional tracking devices, and the signals may be processed collectively to determine the relative position and orientation (e.g., relative pose) information between the two devices. The primary tracking device 200 may be configured to transmit the relative pose information, and the pose information of the primary tracking device 200, to a secondary or additional tracking device, thereby allowing the secondary or additional tracking device to perform a calibration action (e.g., to calibrate an IMU).

While FIG. 2 shows a certain number of components in a particular configuration, one of ordinary skill in the art will appreciate that the primary tracking device 200 may include more components or fewer components, combinations of one or more components into a single component, certain components implemented as two or more components, and/or components arranged in any number of alternate configurations without departing from the scope of examples described herein. Additionally, although not shown in FIG. 2, one of ordinary skill in the art will appreciate that the primary tracking device 200 may, when powered on, execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 2.

Figure 3:
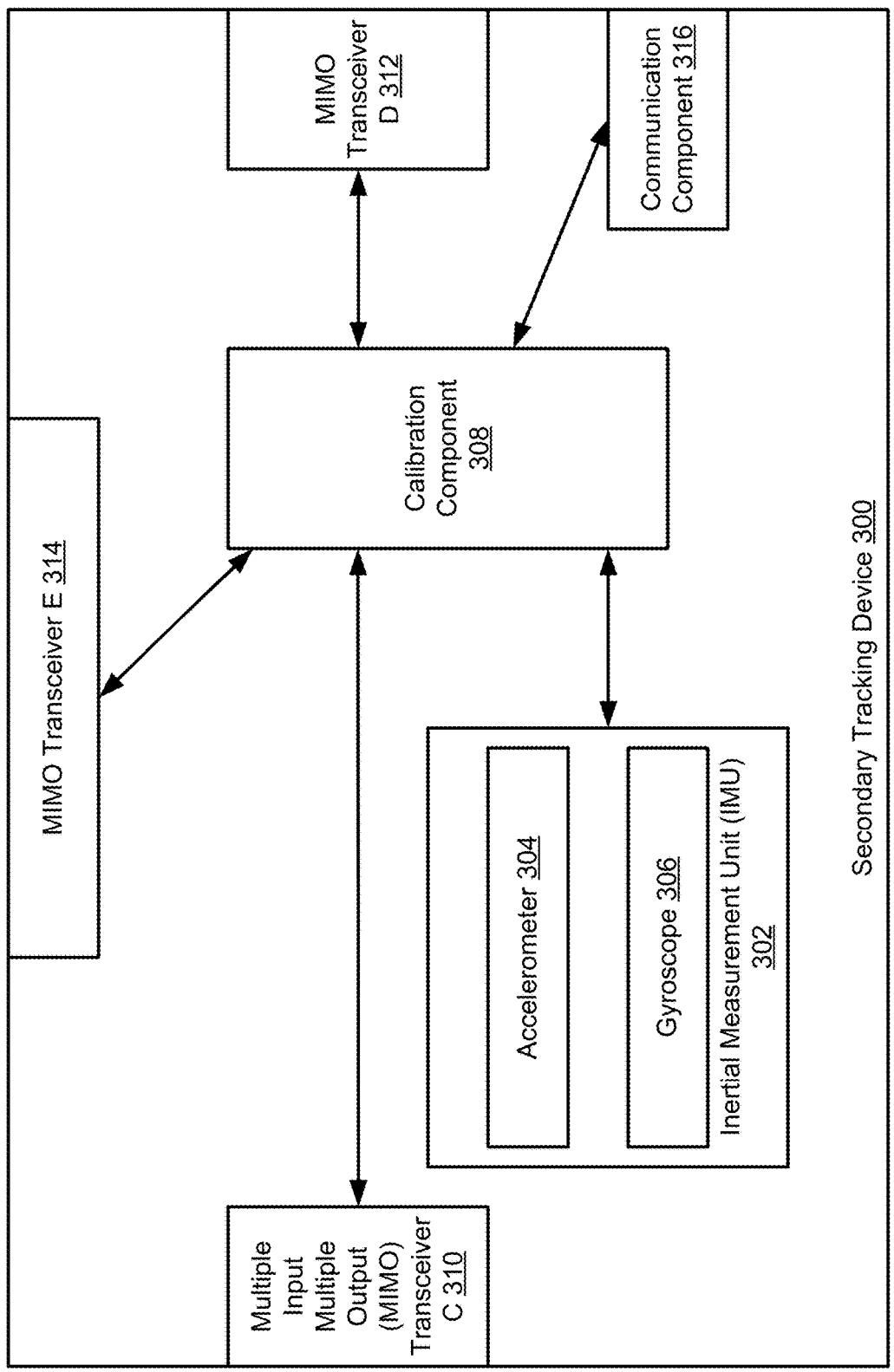
FIG. 3 is a block diagram illustrating a secondary tracking device, in accordance with some examples.

FIG. 3 is a block diagram of a secondary tracking device 300 in accordance with one or more examples described herein. In some examples, the secondary tracking device 300 is the same as the secondary tracking device 104 shown in FIG. 1 and described above, and/or any of the additional tracking devices (e.g., 106, 108) shown in FIG. 1 and described above. As such, as discussed above in the description of FIG. 1, examples of a secondary or additional tracking device include, but are not limited to, wearable devices (e.g., extended reality (XR) devices, augmented reality (AR) devices, virtual reality (VR) devices, smartphones, smartwatches, activity trackers, earbuds, headphones, smart rings, smart shoes, etc.), vehicle computing systems, vehicle mount inertial tracking systems, tablet computers, mobile computing devices, navigation devices, etc. As used herein, the terms secondary tracking device and additional tracking device may be used interchangeably As shown in in FIG. 3, the secondary tracking device 300 includes an IMU 302, a calibration component 308, a communication component 316, a MIMO transceiver C 310, a MIMO transceiver D 312, and a MIMO transceiver E 314. The IMU 302 may include an accelerometer 304 and a gyroscope 306 Each of these components is described below.

In some examples, the IMU 302, the accelerometer 304, the gyroscope 306, the MIMO transceivers 310, 312, and 314, and the communication component 316 are substantially similar to the like named components of the primary tracking device 200 shown in FIG. 2 and described above, and may be configured to perform the same or similar functionality as described above. Additionally, the secondary tracking device 300 may include other components described above, but not shown in FIG. 3, such as, for example, a processor, a memory device, a storage device, additional location sensors, an image sensor, etc. The description of such components is not repeated in the description of FIG. 3 for the sake of brevity and clarity.

In some examples, the MIMO transceivers 310, 312, and 314 of the secondary tracking device 300 transmit signals to and/or receive signals from corresponding MIMO transceivers of a primary tracking device (e.g., the primary tracking device 200 of FIG. 2). In some examples, the secondary tracking device 300 includes a calibration component 308. In some examples, the calibration component 308 is any component capable of performing a calibration action to calibrate a sensor or component of the secondary tracking device 300 (e.g., the IMU 302). The calibration component 308 may include and/or be operatively connected to a processor (not shown) of the secondary tracking device 300. In some examples, sensor calibration refers to any process or technique for adjusting a sensor such that the output of the sensor more accurately reflects the true value of whatever the sensor is designed to measure (e.g., acceleration/specific force for an accelerometer, angular velocity for a gyroscope, etc.). The calibration component 308 may perform calibration actions for any number of sensors and/or components of the secondary tracking device without departing from the scope of examples described herein. In some examples, the calibration component 308 is configured to perform calibration actions by, at least in part, using absolute pose information (e.g., the ground truth pose) of the secondary tracking device and the output of one or more sensors (e.g., a sensor being calibrated). In examples in which the secondary tracking device MIMO transceivers (e.g., 310, 312, 314) transmit signals to corresponding MIMO transceivers of a primary tracking device, the calibration component 308 may receive the absolute pose information (e.g., via the communication component 316) from the primary tracking device, which the primary tracking device may generate based on its own pose information and the relative pose information between the primary tracking device and the secondary tracking device. In examples where the secondary tracking device MIMO transceivers (e.g., 310, 312, 314) receive signals from the corresponding MIMO transceivers of a primary tracking device, the calibration component may generate the absolute pose information based on pose information of the primary tracking device received from the primary tracking device, and locally generated relative pose information between the primary tracking device and the secondary tracking device 300.

The secondary tracking device 300 may include any number of MIMO transceivers, and each may be located at a different location of the secondary tracking device 300. The example shown in FIG. 3 shows two of the MIMO transceivers (e.g., 310 and 312) located on opposite sides of the secondary tracking device 300, and the MIMO transceiver E 314 located at the top of the secondary tracking device 300. One of ordinary skill in the relevant art will appreciate that the MIMO transceivers may be located at different locations than is shown in FIG. 3 without departing from the scope of examples described herein.

While FIG. 3 shows a certain number of components in a particular configuration, one of ordinary skill in the art will appreciate that the secondary tracking device 300 may include more components or fewer components, combinations of one or more components into a single component, certain components implemented as two or more components, and/or components arranged in any number of alternate configurations without departing from the scope of examples described herein. Additionally, although not shown in FIG. 3, one of ordinary skill in the art will appreciate that the secondary tracking device 300 may, when powered on, execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 3.

Figure 4:
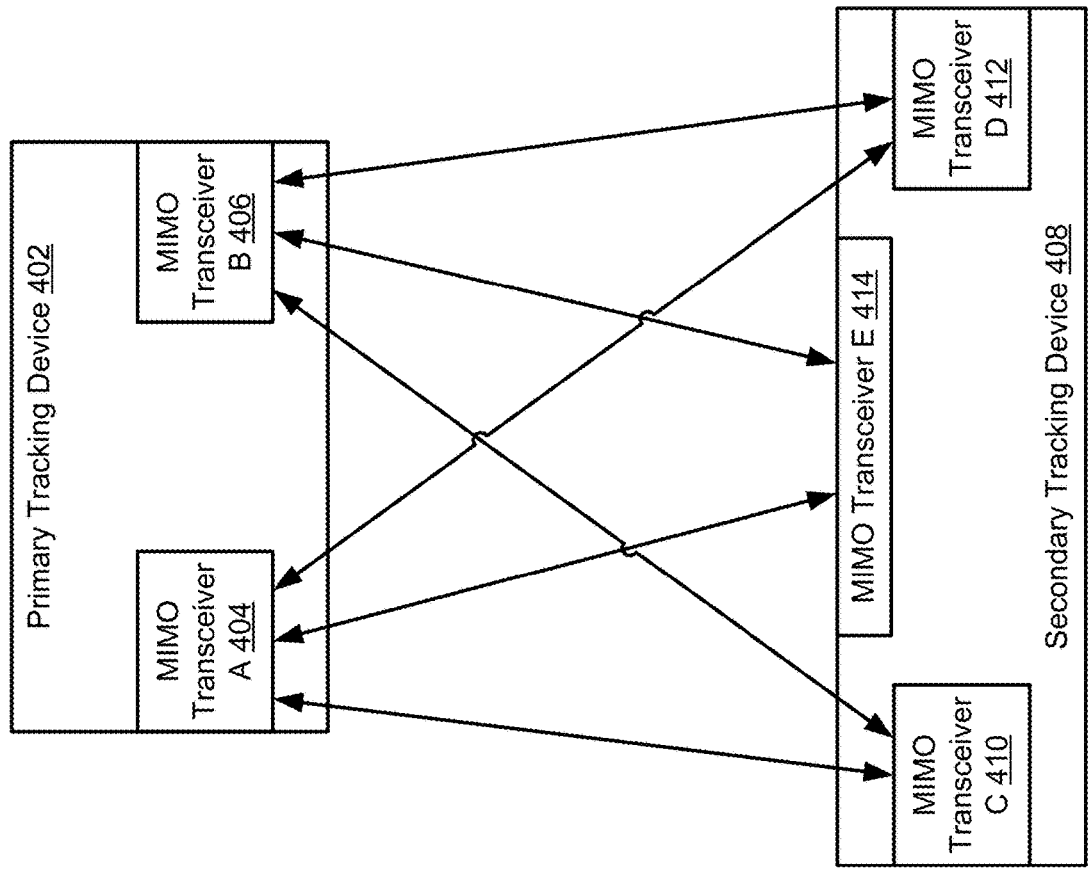
FIG. 4 is a block diagram illustrating a primary tracking device and a secondary tracking device with multiple-input multiple-output (MIMO) transceivers, in accordance with some examples.

FIG. 4 is a block diagram of a tracking device network 400 in accordance with one or more examples described herein. As shown in FIG. 4, the tracking device network 400 includes a primary tracking device 402 and a secondary tracking device 408. The primary tracking device 402 includes a MIMO transceiver A 404 and a MIMO transceiver B 406. The secondary tracking device 408 includes a MIMO transceiver C 410, a MIMO transceiver D 412, and a MIMO transceiver E 414. Each of these components is described below.

As shown in FIG. 4, the tracking device network 400 includes only two tracking devices for the sake of clarity. As discussed above and shown in FIG. 1, a tracking device network may include any number of primary tracking devices, as well as any number of secondary and/or additional tracking devices without departing from the scope of examples described herein. The tracking device network 400 shown in FIG. 4 may be the same or substantially similar to the tracking device network 100 shown in FIG. 1 and described above.

The primary tracking device 402 may be the same or substantially similar to the primary tracking device 102 shown in FIG. 1 and described above and/or to the primary tracking device 200 shown in FIG. 2 and described above. Although the primary tracking device 402 may include any number of components, sensors, etc. (e.g., the components and sensors shown as part of the primary tracking device 200 shown in FIG. 2), such components, sensors, etc., other than the MIMO transceivers, are omitted from FIG. 4 for the sake of clarity.

The secondary tracking device 40 may be the same or substantially similar to the secondary tracking device 104 shown in FIG. 1 and described above and/or to the secondary tracking device 300 shown in FIG. 3 and described above. Although the secondary tracking device 408 may include any number of components, sensors, etc. (e.g., the components and sensors shown as part of the secondary tracking device 300 shown in FIG. 3), such components, sensors, etc., other than the MIMO transceivers, are omitted from FIG. 4 for the sake of clarity. Additionally, although FIG. 4 shows a secondary tracking device 408, as discussed above, secondary tracking devices and additional tracking devices refer to the same types of devices, be interchangeable, etc. Accordingly, the secondary tracking device 408 shown in FIG. 4 could also be referred to as an additional tracking device without departing from the scope of examples described herein.

The MIMO transceiver A 404 and the MIMO transceiver B 406, may each be the same or substantially similar to the MIMO transceiver A 216 and/or the MIMO transceiver B 218 shown in FIG. 2 and described above. The MIMO transceiver C 410, the MIMO transceiver D 412, and the MIMO transceiver E 414 may each be the same or substantially similar to the MIMO transceiver C 310, the MIMO transceiver D 312, and/or the MIMO transceiver E 314 shown in FIG. 3 and described above.

In some examples, MIMO transceivers are located at various locations on the primary tracking device 402 and the secondary tracking device 408. The various locations may be designed to allow for a relative pose (e.g., position and orientation) between the primary tracking device 402 and the secondary tracking device to be ascertained. As shown in FIG. 4, the MIMO transceivers (e.g., 404 and 406) of the primary tracking device 402 are each in communication with each of the MIMO transceivers (e.g., 410, 412, and 414) of the secondary tracking device 408. In some examples, the MIMO transceivers of the primary tracking device 402 and the MIMO transceivers of the secondary tracking device 408 may be MIMO transmitters, MIMO receivers, or function as both receivers and transmitters, depending on the technique being used to determine the relative position (e.g., distance) between two particular MIMO transceivers (e.g., one MIMO transceiver of the primary tracking device 402 and another MIMO transceiver of the secondary tracking device 408).

As an example, the MIMO transceivers may be configured to implement an ultra-wideband (UWB) technique. In such a scenario, each of the MIMO transceivers of the primary tracking device 402 may transmit a signal in the UWB portion of the radio frequency spectrum to each of the MIMO transceivers of the secondary tracking device 408. The MIMO transceivers of the secondary tracking device 408 may receive the signals, and then transmit a corresponding signal back to each of the MIMO transceivers of the primary tracking device 402. The primary tracking device 402 may then perform a time-of-flight (ToF) calculation to determine the distance between each of the MIMO transceivers of the primary tracking device 402 and each of the MIMO transceivers of the secondary tracking device 408. The collective set of distances may then be used to determine the relative position and orientation (pose) of the primary tracking device 402 and the secondary tracking device 408.

In one or more examples, the quantity and locations of the MIMO transceivers on each of the two tracking devices may be what allows for an accurate relative pose to be generated. As an example, a single pair of MIMO transceivers may be used to determine a distance between the MIMO transceivers, but would not allow for fill relative pose information to be generated. However, having a greater number of MIMO transceivers on the two tracking devices, placed at various locations on the tracking devices, may collectively allow for the generation of the relative pose information. In some examples, the quantity and locations of the MIMO transceivers is sufficient to allow for the generation of 6DoF relative pose information between the primary tracking device 402 and the secondary tracking device 408.

Although the above example used a relative pose generation technique based on UWB signals, any frequency and/or wavelength of signal may be used to implement any technique by which the distances between MIMO transceivers may be ascertained and used to generate relative pose information, and such techniques may use any type of calculation (e.g., other than a ToF calculation) to determine distances. As such, in some examples, the MIMO transceivers of the primary tracking device 402 and the secondary tracking device 408 may each be configured to both transmit and receive signals (e.g., as in the UWB example described above). In other examples, the MIMO transceivers of the primary tracking device 402 may be receivers that receive signals, and the MIMO transceivers of the secondary tracking device 408 may be transmitters that transmit signals. In still other examples, the converse may be true, with the MIMO transceivers of the primary tracking device 402 transmitting signals and the MIMO transceivers of the secondary tracking device 408 receiving the signals. Therefore, either the primary tracking device 402 or the secondary tracking device 408 may be the tracking device that generates the relative pose information, depending on the configuration of the respective MIMO transceivers and/or the pose generation technique being used. Examples of such techniques include, but are not limited to, UWB, mmWave, ultrasonic, Wi-Fi, Bluetooth, etc.

In some examples, the relative pose information, whether generated by the primary tracking device 402 or the secondary tracking device 408, is used in conjunction with the pose information of the primary tracking device 402 to generate the absolute pose information for the secondary tracking device 408. As an example, the pose information of the primary tracking device 402 may be pose information within the environment in which the tracking device network 400 is deployed. Combining that pose information with the relative pose information between the primary tracking device 402 and the secondary tracking device 408 may yield the absolute pose information of the secondary tracking device 408. The absolute pose information of the secondary tracking device 408 may be generated by the primary tracking device 402 in some examples, and by the secondary tracking device 408 in other examples.

In some examples, the absolute pose information for the secondary tracking device 408 is used by the secondary tracking device 408 to perform a calibration action on any one or more sensors or components (e.g., an IMU) of the secondary tracking device 408. As discussed above, a calibration action is any adjustment of any one or more sensors, modification of the output of such sensors, etc. that cause the sensor or component to have an output that more closely tracks the ground truth location, position, and/or orientation of the secondary tracking device 408 within an environment. In some examples, using the techniques described herein, such calibration actions may be performed on any recurring schedule, such as, for example, periodically, on demand, any time the calibration of the sensor or component has degraded below a threshold level of confidence, etc., so long as the tracking device network 400 includes at least one primary tracking device. In some examples, for a period of time after a calibration action, the secondary tracking device 408 may be considered a new primary tracking device within the tracking device network 400. In some examples, the period of time depends on known characteristics of the sensor and/or component related to sensor bias, rate of sensor drift, etc.

While FIG. 4 shows a certain number of components in a particular configuration, one of ordinary skill in the art will appreciate that the tracking device network may include more components or fewer components, combinations of one or more components into a single component, certain components implemented as two or more components, and/or components arranged in any number of alternate configurations without departing from the scope of examples described herein. Additionally, although not shown in FIG. 4, one of ordinary skill in the art will appreciate that the tracking devices 402 and 408 may, when powered on, execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 4.

FIG. 5 is a block diagram of an example tracking device network 500 in accordance with one or more examples described herein. As shown in FIG. 5, the tracking device network 500 that includes a primary tracking device 502, a new primary tracking device 504, an additional tracking device A 506, and an additional tracking device B 508. Each of these components is described below.

The primary tracking device 502 may be the same as or substantially similar to the primary tracking device 102 shown in FIG. 1, the primary tracking device 200 shown in FIG. 2 and/or the primary tracking device 402 shown in FIG. 4, each of which is described above. The additional tracking device A 506 and the additional tracking device 508 may be the same as or substantially similar to the secondary tracking device 104 shown in FIG. 1, the additional tracking device A 106 shown in FIG. 1, the additional tracking device B 508 shown in FIG. 1, the secondary tracking device 300 shown in FIG. 3, and/or the secondary tracking device 408 shown in FIG. 4, each of which is described above.

The new primary tracking device 504 may be the same as or substantially similar to the secondary tracking device 104 shown in FIG. 1, the additional tracking device A 106 shown in FIG. 1, the additional tracking device B 508 shown in FIG. 1, the secondary tracking device 300 shown in FIG. 3, and/or the secondary tracking device 408 shown in FIG. 4, each of which is described above.

FIG. 5 is intended to illustrate an example scenario in which the tracking device network 500 formerly appeared the same as or substantially similar to the tracking device network 100 shown in FIG. 1. However, as shown in FIG. 5, the primary tracking device 502 is no longer part of the tracking device network. As an example, the primary tracking device 502 may have been powered off, lost communication ability, had certain components and/or features deactivated, etc. Any other technique for removing the primary tracking device 502 from the tracking device network 500 may have occurred without departing from the scope of examples described herein.

In the example scenario shown in FIG. 5, prior to the removal of the primary tracking device 502 from the tracking device network 500, the primary tracking device 502 and a secondary tracking device (shown in FIG. 5 as the new primary tracking device 504 and described further below) interacted to provide absolute pose information of the secondary tracking device to the secondary tracking device. To achieve this, in some examples, the primary tracking device 502 generate high accuracy pose information of the primary tracking device 502. Additionally, either the primary tracking device 502 or the secondary tracking device generated relative pose information using a quantity of MIMO transceivers at various locations on each device. Next, either the primary tracking device 502 or the secondary tracking device generated the absolute pose information of the secondary tracking device using the pose information of the primary tracking device 502 and the relative pose information. In some examples, the secondary tracking device used the absolute pose information (e.g., as locally generated or received from the primary tracking device 502) to perform a calibration action for an IMU (not shown) of the secondary tracking device. In some examples, once the calibration action is successfully completed, the secondary tracking device becomes the new primary tracking device 504 shown in FIG. 5.

In some examples, the new primary tracking device 504 and the primary tracking device 502 both function as primary tracking devices within the tracking device network until such time as the primary tracking device 502 is removed from the tracking device network 500, or until time passes and the calibration of the IMU degrades below an acceptable level of confidence. However, in the event that the primary tracking device 502 is removed from the tracking device network 500 while the new primary tracking device 504 remains sufficiently calibrated to be considered a primary tracking device, the new primary tracking device 504 may function as a primary tracking device in the tracking device network with respect to any other tracking device remaining in the tracking device network (e.g., the additional tracking device 506, the additional tracking device 508).

While FIG. 5 shows a certain number of components in a particular configuration, one of ordinary skill in the art will appreciate that the tracking device network 500 may include more components or fewer components, combinations of one or more components into a single component, certain components implemented as two or more components, and/or components arranged in any number of alternate configurations without departing from the scope of examples described herein. Additionally, although not shown in FIG. 5, one of ordinary skill in the art will appreciate that the tracking devices 502, 504, 506, and 508 may, when powered on, execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 5.

Figure 6A:
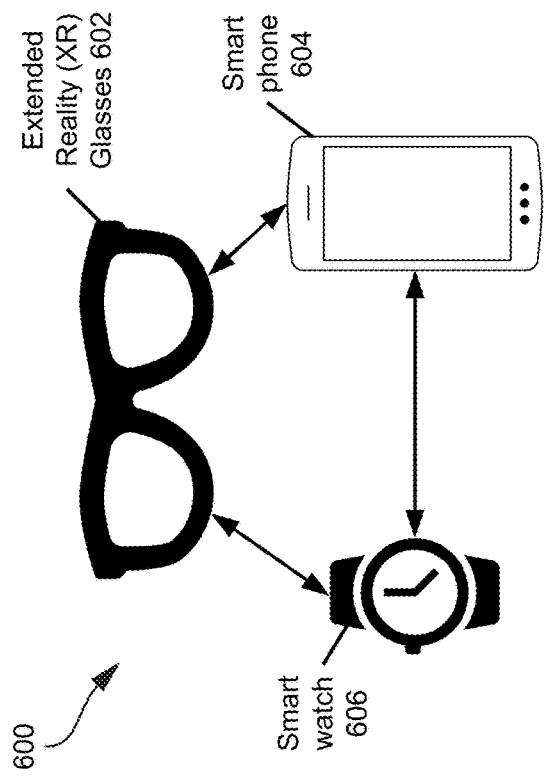
FIG. 6A illustrates an exemplary network of tracking devices that includes an extended reality (XR) device, a smartphone, and a smartwatch, in accordance with some examples.
Figure 6B:
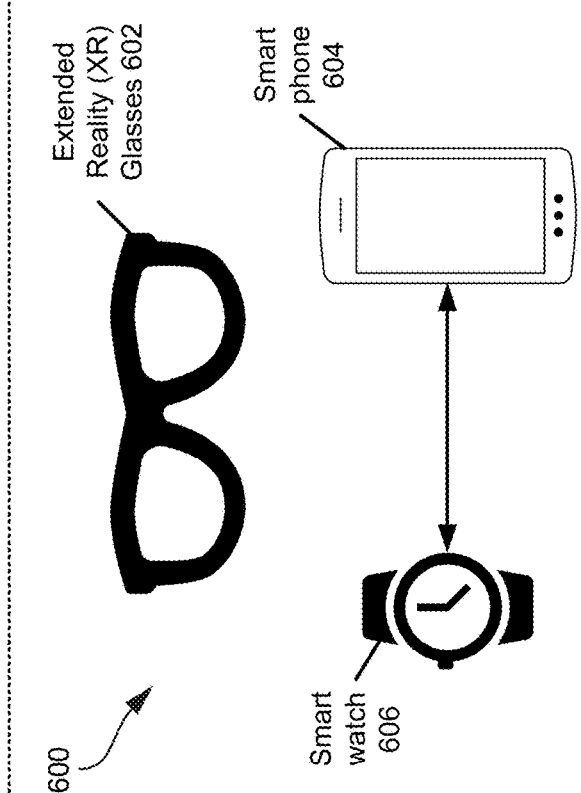
FIG. 6B illustrates an exemplary network of tracking devices that includes a smartphone, and a smartwatch after an extended reality (XR) device is removed from the network, in accordance with some examples.

FIG. 6A and FIG. 6B illustrate an example tracking device network 600 in accordance with one or more examples described herein. The following example is for explanatory purposes only and not intended to limit the scope of examples described herein. Additionally, while the example shows certain aspects of examples described herein, all possible aspects of such examples may not be illustrated in this particular example.

Referring now to FIG. 6A, consider a scenario in which a user is wearing XR glasses 602 and a smartwatch 606, and has a smartphone 604 in the pocket of the user. The XR glasses 602, the smartwatch 606, and the smartphone 604 are each configured to participate in a tracking device network. As such, they may be the same as or substantially similar (e.g., in regards to included components, sensors, etc.) as the tracking devices described above (e.g., 102, 104, 106, and/or 108 of FIG. 1; 200 of FIG. 2; 300 of FIGS. 3; 402 and 408 of FIG. 4; and/or 502; 504; 506; and/or 508 of FIG. 5). Specifically, the XR glasses are configured as a primary tracking device (e.g., primary tracking device 200 shown in FIG. 2 and described above). The smartphone is a secondary tracking device (e.g., the secondary tracking device 300 shown in FIG. 3 and described above). The smartwatch 606 is an additional tracking device in the tracking device network 600.

The XR glasses 602, as a primary tracking device, have a relatively higher accuracy for tracking location and pose of the XR glasses 602 as compared to the smartphone 604 or the smartwatch 606. Additionally, the smartphone 604, while having generally lower accuracy than the XR glasses, has relatively higher accuracy than the smartwatch 606, due to additional sensors and components. Moreover, the smartphone 604, if removed from the pocket of the user with an activated camera, is capable of being a primary tracking device, though is not when in the pocket. Both the smartphone 604 and the smartwatch 606 include an IMU (not shown) that is to be calibrated periodically while the tracking device network 600 is active with the XR glasses 602 being part of the tracking device network 600.

In such a scenario, the user may initially activate (e.g., power on) the XR glasses 602. The XR glasses 602 may then use any sensors or components therein (e.g., camera, IMU, GPS receiver, etc.) to generate pose information for the XR glasses 602. Additionally, the XR glasses include several MIMO transceivers, and implement a UWB-based technique for transmitting and receiving signals from MIMO transceivers of the smartphone 604 and the smartwatch 606 in order to generate relative pose information between the XR glasses 602 and the smartphone 604, as well as between the XR glasses 602 and the smartwatch 606. The pose information of the XR glasses 602 and the relative pose information are then used to determine the absolute pose information for the smartphone 604. The smartphone 604 includes more compute resources than the smartwatch 606. Accordingly, the smartphone 604 performs a calibration action, and thus calibrates its IMU, before the smartwatch 606 achieves a state of being calibrated above a threshold level of accuracy confidence.

After the smartphone 604 is calibrated, but before the smartwatch 606 has finished performing a calibration action, the user powers off the XR glasses 602, thereby removing the XR glasses 602 from the tracking device network, as shown in FIG. 6B. Because the smartphone 604 is calibrated, the smartphone 604 becomes a new primary tracking device within the tracking device network 600.

In this scenario, the user then removes the smartphone 604 from the user's pocket, and activates the camera and the GPS receiver of the smartphone. With these additional features, the smartphone 604 is capable of remaining a primary tracking device, as it can self-calibrate and determine its pose information. Next, the smartphone 604 uses its MIMO transceivers to transmit and receive signals from the MIMO transceivers of the smartwatch 606 in order to determine relative pose information between the smartphone 604 and the smartwatch 606. The pose information of the smartphone 604 and the relative pose information are then used to determine the absolute pose information for the smartwatch 606. At this point, both the smartphone 604 and the smartwatch 606 may be considered primary tracking devices within the tracking device network 600.

Sometime later, the user returns the smartphone 604 to the pocket of the user, removing the previously activated functionality for the smartphone 604. Therefore, the IMU of both the smartphone 604 and the smartwatch 606 begins to become increasingly mis-calibrated. However, the user then arrives at the user's destination (e.g., an indoor shopping center, a virtually rendered environment, etc.), and re-activates the XR glasses 602, thereby returning the tracking device network to the state shown in FIG. 6A. At this point, the XR glasses 602 resume being a primary tracking device within the tracking device network 600, and the periodic calibrations of the smartphone 604 and the smartwatch 606, as described above, resume.

Figure 7:
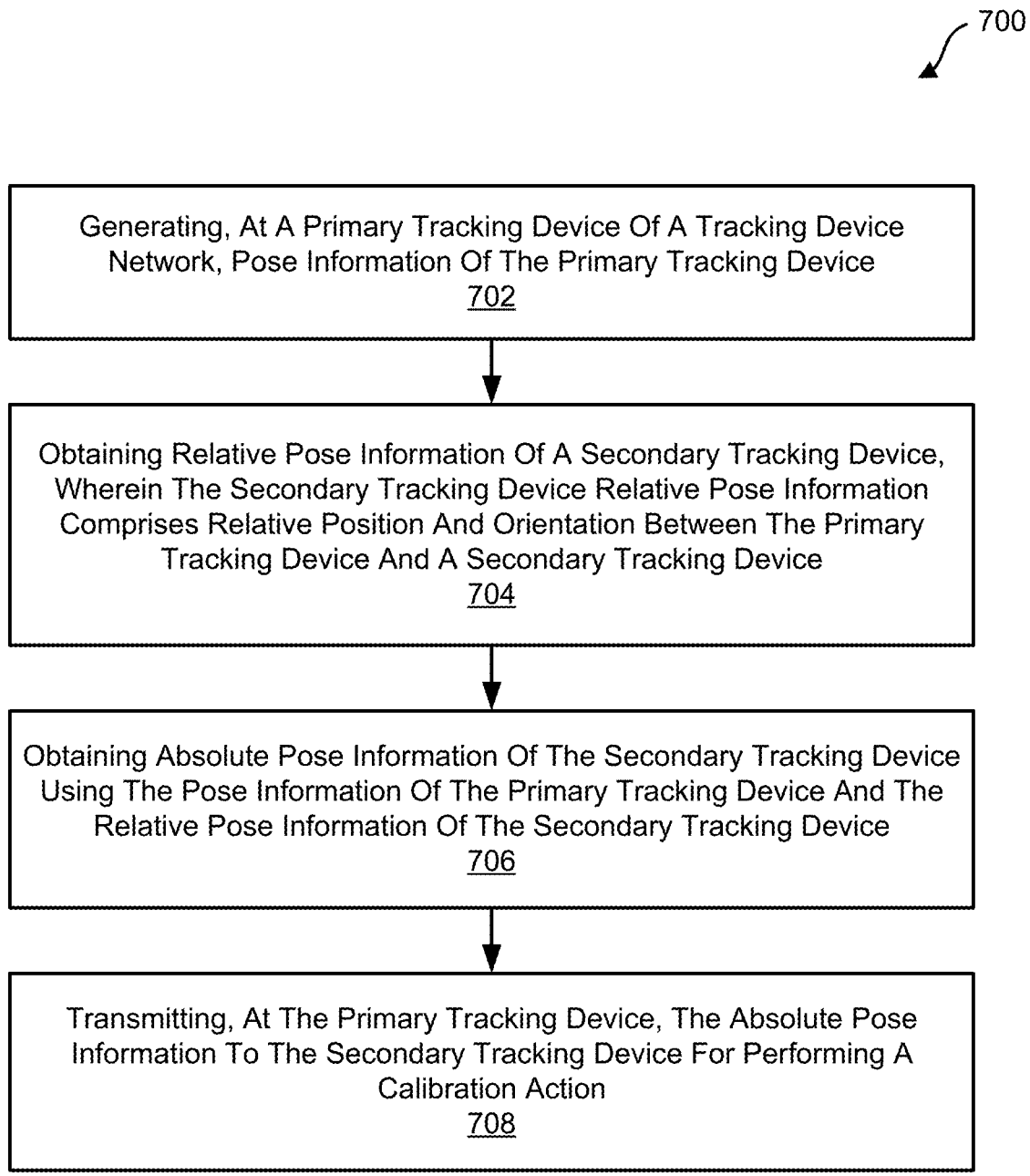
FIG. 7 is a flow diagram illustrating an example process for tracking device calibration, in accordance with some examples.

FIG. 7 is a flow diagram illustrating an example of a process 700 for tracking device calibration in accordance with examples described herein. The process 700 may be performed, at least in part, for example, by the primary tracking device 102 shown in FIG. 1, the primary tracking device 200 shown in FIG. 2, the primary tracking device 402 shown in FIG. 4, the primary tracking device 502 or the new primary tracking device 504 shown in FIG. 5, and/or the XR glasses 602 or the smartphone 604 shown in FIG. 6A and FIG. 6B. Additionally or alternatively, the process 700, or any portions therein, may be performed by any tracking device included in the tracking device network 100 shown in FIG. 1, the tracking device network 400 shown in FIG. 4, the tracking device network 500 shown in FIG. 5, and/or the tracking device network shown in FIG. 6.

At block 702, the process 700 includes generating, at a primary tracking device of a tracking device network, pose information of the primary tracking device. In some examples, generating the pose information of the primary tracking device includes using any one or more sensors and/or components of the primary tracking device. As an example, the primary tracking device may use information from a GPS receiver, image data of the surrounding environment captured by a camera, and the output of an IMU to generate 6DoF pose information of the primary tracking device.

At block 704, the process 700 includes obtaining relative pose information of a secondary tracking device of the tracking device network, wherein the relative pose information of the secondary tracking device comprises a relative position and orientation between the primary tracking device and the secondary tracking device. In some examples, generating the relative pose information includes transmitting signals (e.g., UWB signals, mmWave signals, ultrasonic signals, etc.) between MIMO transceivers of the primary tracking device and a secondary tracking device in order to determine a relative distance between the various MIMO transceivers, which may then be used to generate the relative pose information. In some examples, the relative pose information is obtained by being generated at the primary tracking device. In some examples, the relative pose information is obtained by the primary tracking device from the secondary tracking device after being generated by the secondary tracking device.

At block 706, the process 700 includes obtaining absolute pose information of the secondary tracking device using the pose information of the primary tracking device and the relative pose information of the secondary tracking device. In some examples, the absolute pose information is generated by combining the pose information of the primary tracking device, which is the position and orientation of the primary tracking device within an environment, with the relative pose information, which is the position and orientation of the secondary tracking device with respect to the primary tracking device. In some examples, the absolute pose information is obtained by being generated by the primary tracking device. In some examples, the absolute pose information is obtained after being generated by the secondary tracking device, At block 708, the process 700 includes transmitting, at the primary tracking device, the absolute pose information to the secondary tracking device for performing a calibration action. In some examples, the absolute pose information is transmitted using any suitable communication technology (e.g., Wi-Fi, Bluetooth, etc.). In some examples, the secondary tracking device uses the absolute pose information to calibrate one or more sensors and/or components therein (e.g., an IMU).

Figure 8:
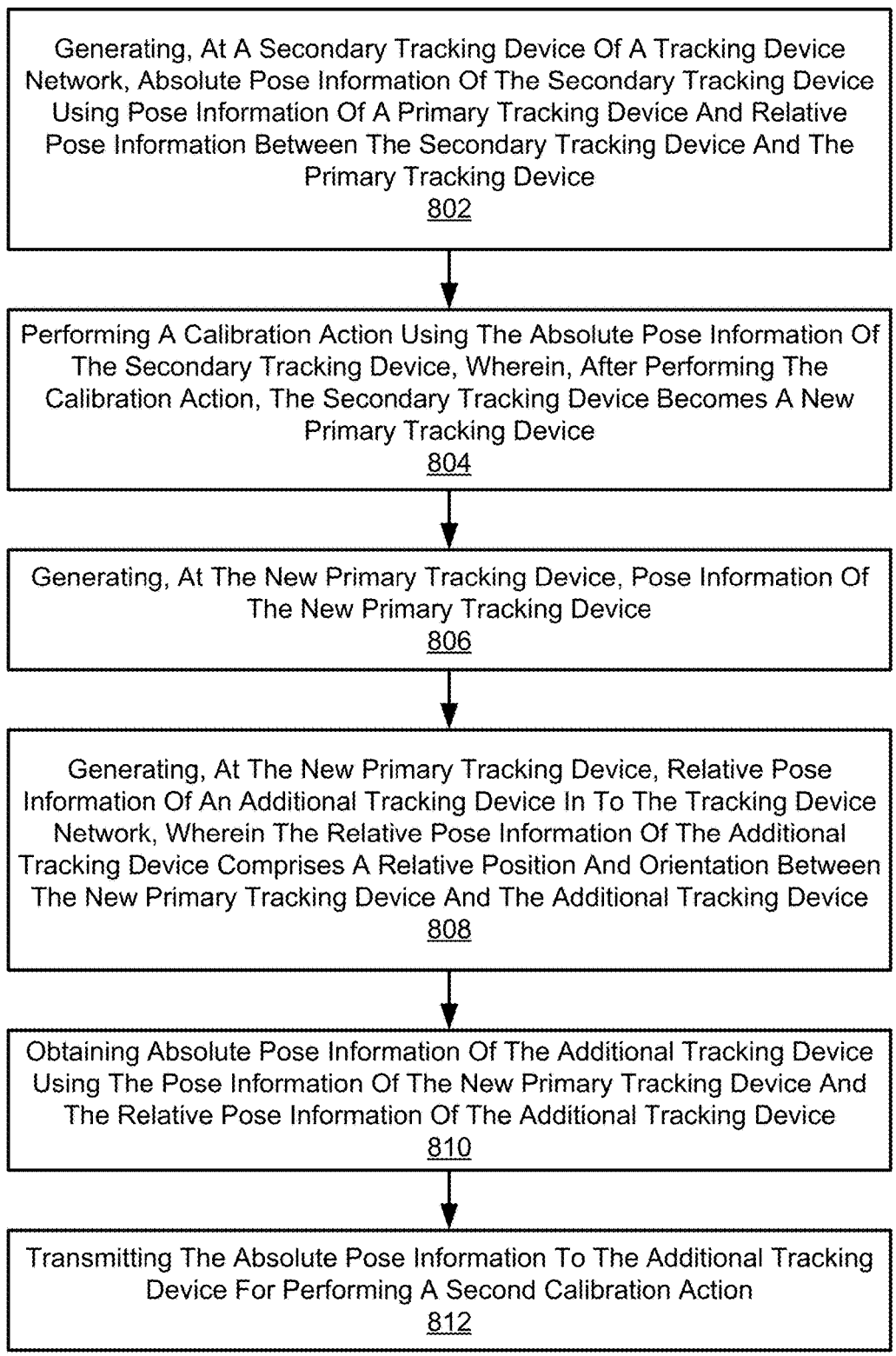
FIG. 8 is a flow diagram illustrating an example of a process for tracking device calibration, in accordance with some examples.

FIG. 8 is a flow diagram illustrating an example of a process 800 for tracking device calibration in accordance with examples described herein. The process 800 may be performed, at least in part, for example, by the secondary tracking device 104 shown in FIG. 1, the secondary tracking device 300 shown in FIG. 3, the secondary tracking device 408 shown in FIG. 4, the new primary tracking device 504 shown in FIG. 5, and/or the smartphone 604 shown in FIG. 6A and FIG. 6B. Additionally or alternatively, the process 800, or any portions therein, may be performed by any tracking device included in the tracking device network 100 shown in FIG. 1, the tracking device network 400 shown in FIG. 4, the tracking device network 500 shown in FIG. 5, and/or the tracking device network shown in FIG. 6.

At block 802, the process 800 includes generating, at a secondary tracking device of a tracking device network, absolute pose information of the secondary tracking device using pose information of a primary tracking device and relative pose information between the secondary tracking device and the primary tracking device. In some examples, the absolute pose information is generated by combining the pose information of the primary tracking device, which is the position and orientation of the primary tracking device within an environment, with the relative pose information, which is the position and orientation of the secondary tracking device with respect to the primary tracking device, thereby obtaining the absolute pose information of the secondary tracking device within the environment.

At block 804, the process 800 includes performing a calibration action using the absolute pose information of the secondary tracking device, wherein, after performing the calibration action, the secondary tracking device becomes a new primary tracking device. In some examples, performing the calibration action includes calibrating one or more sensors of the secondary tracking device such that the tracking accuracy of the secondary tracking device is at or above a desired confidence threshold. As an example, the secondary tracking device may adjust one or more sensors, establish changes or modifications to the output of one or more sensors, etc. such that the one or more sensors or components provide an output that is within a desired confidence level of accuracy relative to the ground truth of the pose of the secondary tracking device within the environment. In some examples, once the calibration action is completed, the secondary tracking device becomes a new primary tracking device within the tracking device network, and may remain as such for as long a the calibration remains above the desired confidence level.

At block 806, the process 800 includes generating, at the new primary tracking device, pose information of the new primary tracking device. In some examples, the pose information of the new primary tracking device is generated after the calibration action performed in block 804, but before the confidence level in the accuracy of the one or more sensors of the new primary tracking device falls below a desired threshold.

At block 808, the process 800 includes generating, at the new primary tracking device, relative pose information of an additional tracking device in the tracking device network, wherein the relative pose information of the additional tracking device comprises a relative position and orientation between the new primary tracking device and the additional tracking device. In some examples, generating the relative pose information includes transmitting signals (e.g., UWB signals, mmWave signals, ultrasonic signals, etc.) between MIMO transceivers of the new primary tracking device and the additional tracking device in order to determine a relative distance between the various MIMO transceivers, which may then be used to generate the relative pose information. In some examples, the relative pose information is obtained by being generated at the new primary tracking device. In some examples, the relative pose information is obtained by the new primary tracking device from the additional tracking device after being generated by the additional tracking device.

At block 810, the process 800 includes obtaining absolute pose information of the additional tracking device using the pose information of the new primary tracking device and the relative pose information of the additional tracking device. In some examples, the absolute pose information is generated by combining the pose information of the new primary tracking device, which is the position and orientation of the new primary tracking device within an environment, with the relative pose information, which is the position and orientation of the additional tracking device with respect to the new primary tracking device, thereby obtaining the absolute pose information of the additional tracking device within the environment.

At block 812, the process 800 includes transmitting the absolute pose information to the additional tracking device for performing a second calibration action. In some examples, the absolute pose information is transmitted using any suitable communication technology (e.g., Wi-Fi, Bluetooth, etc.). In some examples, the additional tracking device uses the absolute pose information to calibrate one or more sensors and/or components therein (e.g., an IMU).

In some examples, the processes 700, 800, or any other process described herein may be performed by a computing device or apparatus, and/or one or more components therein and/or to which the computing device is operatively connected. As an example, the process 700 may be performed wholly or in part by any primary tracking device (e.g., the primary tracking device 102 shown in FIG. 1, the primary tracking device 200 shown in FIG. 2, the primary tracking device 402 shown in FIG. 4), the XR glasses 602 shown in FIG. 6A). As another example, the process 800 may be performed wholly or in part by any new primary tracking device such as, for example: the secondary tracking device 104, the additional tracking device A 106, and/or the additional tracking device B 108 shown in FIG. 1 after performing a calibration action; the secondary tracking device 300 shown in FIG. 3 after performing a calibration action; the secondary tracking device 408 shown in FIG. 4 after performing a calibration action; the new primary tracking device 504 shown in FIG. 5; and/or the smartphone 604 shown in FIG. 6B. The processes 700 and 800 may additionally or alternatively be performed by any tracking device in any tracking device network (e.g., tracking device network 100 shown in FIG. 1, tracking device network 400 shown in FIG. 4, tracking device network 500 shown in FIG. 5, and/or tracking device network 600 shown in FIGS. 6A and 6B).

A tracking device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 700, the process 800, and/or other process described herein. In some cases, the computing device or apparatus (e.g., the tracking device) may include various components, such as one or more input devices, one or more output devices, one or more processors, one or more microprocessors, one or more microcomputers, one or more cameras, one or more sensors, and/or other component(s) that are configured to carry out the operations of processes described herein. In some examples, the computing device may include a display, a network interface configured to communicate and/or receive the data, any combination thereof, and/or other component (s). The network interface may be configured to communicate and/or receive Internet Protocol (IP) based data or other type of data.

The components of a tracking device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented, at least in part, using computer software, firmware, or any combination thereof, to perform the various operations described herein.

The process 700 shown in FIG. 7, and the processes 800 shown in FIG. 8 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700, the process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
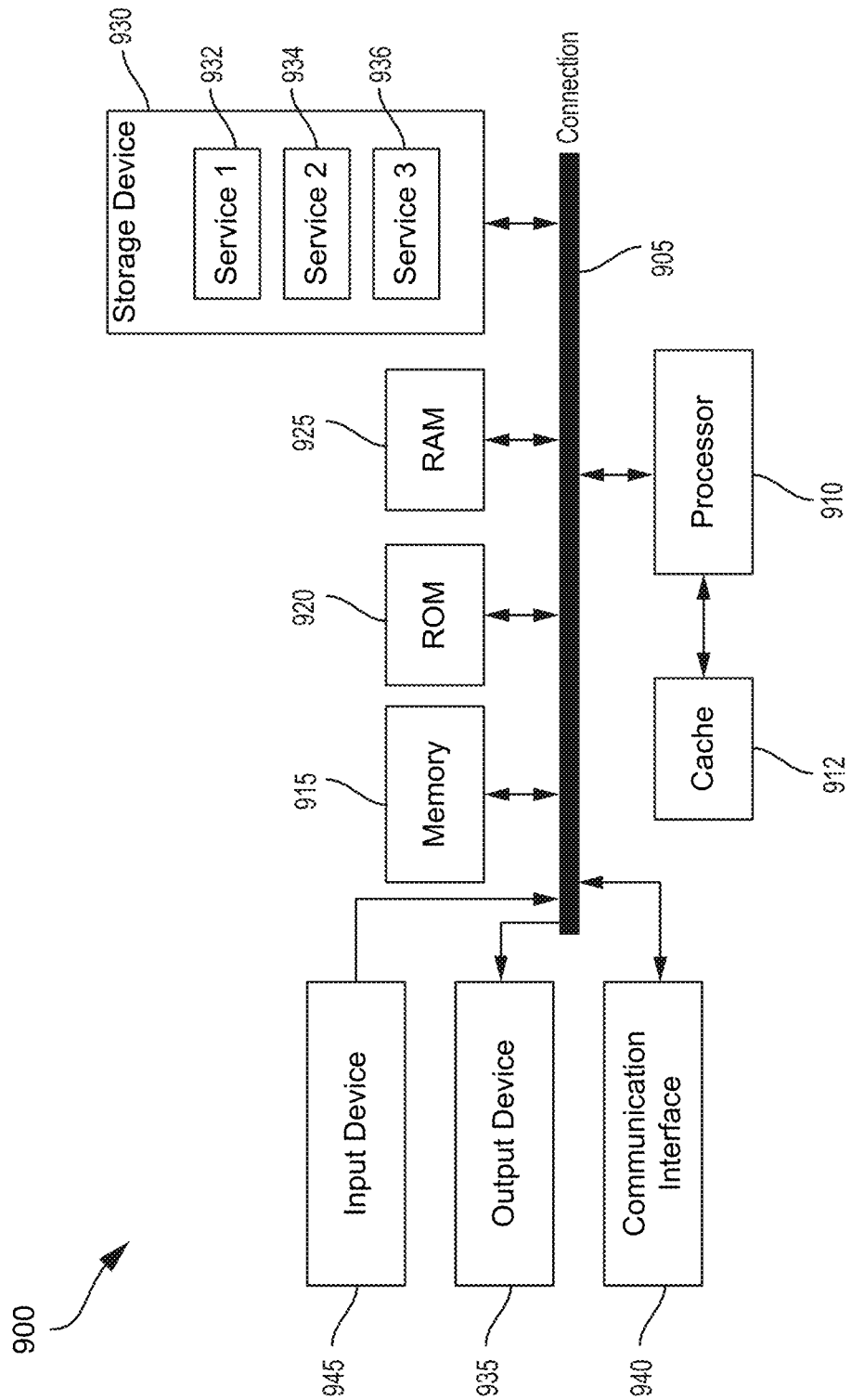
FIG. 9 is a diagram illustrating an example of a computing system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some examples, computing system 900 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash storage, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some examples, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, hardware, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for tracking device calibration, the method comprising: generating, at a primary tracking device of a tracking device network, pose information of the primary tracking device; obtaining relative pose information of a secondary tracking device of the tracking device network, wherein the relative pose information of the secondary tracking device comprises a relative position and orientation between the primary tracking device and the secondary tracking device; obtaining absolute pose information of the secondary tracking device using the pose information of the primary tracking device and the relative pose information of the secondary tracking device; and transmitting, at the primary tracking device, the absolute pose information to the secondary tracking device for performing a calibration action.

Aspect 2: The method of aspect 1, wherein the calibration action comprises calibrating an inertial measurement unit (IMU) of the secondary tracking device.

Aspect 3: The method of aspects 1 or 2, wherein the pose information of the primary tracking device comprises 6 degree of freedom (6dof) information.

Aspect 4: The method of any of aspects 1-3, wherein the primary tracking device comprises a plurality of sensing devices used when generating the pose information of the primary tracking device.

Aspect 5: The method of any of aspects 1-4, wherein the primary tracking device comprises an extended reality (XR) device or a vehicle navigation system.

Aspect 6: The method of any of aspects 1-5, wherein the secondary tracking device comprises a wearable computing device, a mobile computing device, or a vehicle inertial tracking system.

Aspect 7: The method of any of aspects 1-6, wherein generating the relative pose information of the secondary tracking device comprises using a multiple input multiple output (MIMO) measurement technique.

Aspect 8: The method of any of aspects 1-7, wherein the MIMO measurement technique comprises using one of a millimeter wave (mmWave) relative pose measurement, an ultra-wideband (UWB) relative pose measurement, or an ultrasound relative pose measurement.

Aspect 9: A method for tracking device calibration, the method comprising: generating, at a secondary tracking device of a tracking device network, absolute pose information of the secondary tracking device using pose information of a primary tracking device and relative pose information between the secondary tracking device and the primary tracking device; performing a calibration action using the absolute pose information of the secondary tracking device, wherein, after performing the calibration action, the secondary tracking device becomes a new primary tracking device; generating, at the new primary tracking device, pose information of the new primary tracking device; generating, at the new primary tracking device, relative pose information of an additional tracking device in the tracking device network, wherein the relative pose information of the additional tracking device comprises a relative position and orientation between the new primary tracking device and the additional tracking device; obtaining absolute pose information of the additional tracking device using the pose information of the new primary tracking device and the relative pose information of the additional tracking device; and transmitting the absolute pose information to the additional tracking device for performing a second calibration action.

Aspect 10: The method of aspect 9, wherein the primary tracking device is removed from the tracking device network after the calibration action is performed at the secondary tracking device.

Aspect 11: The method of aspect 9 or 10, wherein the secondary tracking device remains the new primary tracking device based on a confidence level of an accuracy of at least one sensor of the new primary tracking device.

Aspect 12: An apparatus for tracking device calibration, the apparatus comprising: a primary tracking device of a tracking device network comprising: a memory device; and a processor coupled to the memory device and configured to: generate, at the primary tracking device, pose information of the primary tracking device; obtain relative pose information of a secondary tracking device of the tracking device network, wherein the relative pose information of the secondary tracking device comprises a relative position and orientation between the primary tracking device and the secondary tracking device; obtain absolute pose information of the secondary tracking device using the pose information of the primary tracking device and the relative pose information of the secondary tracking device; and transmitting, at the primary tracking device, the absolute pose information to the secondary tracking device for performing a calibration action.

Aspect 13: The apparatus of aspect 12, wherein the calibration action comprises calibrating an inertial measurement unit (IMU) of the secondary tracking device.

Aspect 14: The apparatus of aspect 12 or 13, wherein the pose information of the primary tracking device comprises 6 degree of freedom (6dof) information.

Aspect 15: The apparatus of any of aspects 12-14, wherein the primary tracking device further comprises a plurality of sensing devices used when generating the pose information of the primary tracking device.

Aspect 16: The apparatus of any of aspects 12-15, wherein the primary tracking device comprises an extended reality (XR) device or a vehicle navigation system.

Aspect 17: The apparatus of any of aspects 12-16, wherein the secondary tracking device comprises a wearable computing device, a mobile computing device, or a vehicle inertial tracking system.

Aspect 18: The apparatus of any of aspects 12-17, wherein generating the relative pose information of the secondary tracking device comprises using a multiple input multiple output (MIMO) measurement technique.

Aspect 19: The apparatus of any of aspects 12-18, wherein the MIMO measurement technique comprises using one of a millimeter wave (mmWave) relative pose measurement, an ultra-wideband (UWB) relative pose measurement, or an ultrasound relative pose measurement.

Aspect 20: An apparatus for tracking device calibration, the apparatus comprising: a secondary tracking device of a tracking device network comprising: a memory device; and a processor coupled to the memory device and configured to: generate, at the secondary tracking device, absolute pose information of the secondary tracking device using pose information of a primary tracking device and relative pose information between the secondary tracking device and the primary tracking device; perform a calibration action using the absolute pose information of the secondary tracking device, wherein, after performing the calibration action, the secondary tracking device becomes a new primary tracking device; generate, at the new primary tracking device, pose information of the new primary tracking device; generate, at the new primary tracking device, relative pose information of an additional tracking device in the tracking device network, wherein the relative pose information of the additional tracking device comprises a relative position and orientation between the new primary tracking device and the additional tracking device; obtain absolute pose information of the additional tracking device using the pose information of the new primary tracking device and the relative pose information of the additional tracking device; and transmit the absolute pose information to the additional tracking device for performing a second calibration action.

Aspect 21: The apparatus of aspect 20, wherein the primary tracking device is removed from the tracking device network after the calibration action is performed at the secondary tracking device.

Aspect 22: The apparatus of aspects 20 or 21, wherein the secondary tracking device remains the new primary tracking device based on a confidence level of an accuracy of at least one sensor of the new primary tracking device.

Aspect 23: A non-transitory computer-readable medium having stored thereon instructions that, when executed by one or more processors, cause the one or more processors to perform operations according to any of aspects 1 to 22.

What is claimed is:

1. A method for tracking device calibration, the method comprising:
generating, at a primary tracking device of a tracking device network, pose information of the primary tracking device;
obtaining relative pose information of a secondary tracking device of the tracking device network, wherein the relative pose information of the secondary tracking device comprises a relative position and orientation between the primary tracking device and the secondary tracking device;
obtaining absolute pose information of the secondary tracking device using the pose information of the primary tracking device and the relative pose information of the secondary tracking device; and transmitting, at the primary tracking device, the absolute pose information to the secondary tracking device for performing a calibration action by the secondary tracking device that causes the secondary tracking device to become a new primary tracking device for generating pose information for an additional tracking device.

2. The method of claim 1, wherein the calibration action comprises calibrating an inertial measurement unit (IMU) of the secondary tracking device.

3. The method of claim 1, wherein the pose information of the primary tracking device comprises 6 degree of freedom (6dof) information.

4. The method of claim 1, wherein the primary tracking device comprises a plurality of sensing devices used when generating the pose information of the primary tracking device.

5. The method of claim 1, wherein the primary tracking device comprises an extended reality (XR) device or a vehicle navigation system.

6. The method of claim 1, wherein the secondary tracking device comprises a wearable computing device, a mobile computing device, or a vehicle inertial tracking system.

7. The method of claim 1, wherein generating the relative pose information of the secondary tracking device comprises using a multiple input multiple output (MIMO) measurement technique.

8. The method of claim 7, wherein the MIMO measurement technique comprises using one of a millimeter wave (mmWave) relative pose measurement, an ultra-wideband (UWB) relative pose measurement, or an ultrasound relative pose measurement.

9. The method of claim 1, wherein the calibration action comprises at least one of an adjustment of a sensor, or a modification of an output of the sensor.

10. A method for tracking device calibration, the method comprising:
generating, at a secondary tracking device of a tracking device network, absolute pose information of the secondary tracking device using pose information of a primary tracking device and relative pose information between the secondary tracking device and the primary tracking device;
performing a calibration action, by the secondary tracking device, using the absolute pose information of the secondary tracking device, wherein, based on performing the calibration action, the secondary tracking device becomes a new primary tracking device;
generating, at the new primary tracking device, pose information of the new primary tracking device;
generating, at the new primary tracking device, relative pose information of an additional tracking device in the tracking device network, wherein the relative pose information of the additional tracking device comprises a relative position and orientation between the new primary tracking device and the additional tracking device;
obtaining absolute pose information of the additional tracking device using the pose information of the new primary tracking device and the relative pose information of the additional tracking device; and
transmitting the absolute pose information to the additional tracking device for performing a second calibration action.

11. The method of claim 10, wherein the primary tracking device is removed from the tracking device network after the calibration action is performed at the secondary tracking device.

12. The method of claim 10, wherein the secondary tracking device remains the new primary tracking device based on a confidence level of an accuracy of at least one sensor of the new primary tracking device.

13. An apparatus for tracking device calibration, the apparatus comprising:
a primary tracking device of a tracking device network comprising;
a memory device; and
a processor coupled to the memory device and configured to:
generate, at the primary tracking device, pose information of the primary tracking device;
obtain relative pose information of a secondary tracking device of the tracking device network, wherein the relative pose information of the secondary tracking device comprises a relative position and orientation between the primary tracking device and the secondary tracking device;
obtain absolute pose information of the secondary tracking device using the pose information of the primary tracking device and the relative pose information of the secondary tracking device; and
transmit, at the primary tracking device, the absolute pose information to the secondary tracking device for performing a calibration action by the secondary tracking device that causes the secondary tracking device to become a new primary tracking device for generating pose information for an additional tracking device.

14. The apparatus of claim 13, wherein the calibration action comprises calibrating an inertial measurement unit (IMU) of the secondary tracking device.

15. The apparatus of claim 13, wherein the pose information of the primary tracking device comprises 6 degree of freedom (6dof) information.

16. The apparatus of claim 13, wherein the primary tracking device further comprises a plurality of sensing devices used when generating the pose information of the primary tracking device.

17. The apparatus of claim 13, wherein the primary tracking device comprises an extended reality (XR) device or a vehicle navigation system.

18. The apparatus of claim 13, wherein the secondary tracking device comprises a wearable computing device, a mobile computing device, or a vehicle inertial tracking system.

19. The apparatus of claim 13, wherein generating the relative pose information of the secondary tracking device comprises using a multiple input multiple output (MIMO) measurement technique.

20. The apparatus of claim 19, wherein the MIMO measurement technique comprises using one of a millimeter wave (mmWave) relative pose measurement, an ultra-wideband (UWB) relative pose measurement, or an ultrasound relative pose measurement.

21. An apparatus for tracking device calibration, the apparatus comprising:
a secondary tracking device of a tracking device network comprising:
a memory device; and
a processor coupled to the memory device and configured to:
generate, at the secondary tracking device, absolute pose information of the secondary tracking device using pose information of a primary tracking device and relative pose information between the secondary tracking device and the primary tracking device;

perform a calibration action by the secondary tracking device using the absolute pose information of the secondary tracking device, wherein, based on performing the calibration action, the secondary tracking device becomes a new primary tracking device;

generate, at the new primary tracking device, pose information of the new primary tracking device;

generate, at the new primary tracking device, relative pose information of an additional tracking device in the tracking device network, wherein the relative pose information of the additional tracking device comprises a relative position and orientation between the new primary tracking device and the additional tracking device;

obtain absolute pose information of the additional tracking device using the pose information of the new primary tracking device and the relative pose information of the additional tracking device; and transmit the absolute pose information to the additional tracking device for performing a second calibration action.

22. The apparatus of claim 21, wherein the primary tracking device is removed from the tracking device network after the calibration action is performed at the secondary tracking device.

23. The apparatus of claim 21, wherein the secondary tracking device remains the new primary tracking device based on a confidence level of an accuracy of at least one sensor of the new primary tracking device.

* * * * *